US008424755B1

(12) United States Patent
Irudayam et al.

(10) Patent No.: US 8,424,755 B1
(45) Date of Patent: Apr. 23, 2013

(54) BANKING APPARATUS OPERATED RESPONSIVE TO DATA BEARING RECORDS

(75) Inventors: Sathish M. Irudayam, North Canton, OH (US); Marcelo Castro, Canton, OH (US); John E. Williams, North Canton, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 27 days.

(21) Appl. No.: 13/199,452

(22) Filed: Aug. 31, 2011

Related U.S. Application Data

(60) Provisional application No. 61/402,675, filed on Sep. 2, 2010.

(51) Int. Cl.
*G06Q 40/00* (2012.01)
*G07D 11/00* (2006.01)
*G07F 19/00* (2006.01)

(52) U.S. Cl.
USPC ........... 235/379; 235/487; 235/375; 235/381; 705/43; 705/45

(58) Field of Classification Search .................. 235/379, 235/487, 375, 380, 381; 705/43, 45; 902/14, 902/18
See application file for complete search history.

(56) References Cited

U.S. PATENT DOCUMENTS

| | | | | |
|---|---|---|---|---|
| 5,377,586 | A * | 1/1995 | Matsuno | 101/228 |
| 6,315,194 | B1 * | 11/2001 | Graef et al. | 235/379 |
| 2011/0198802 | A1 * | 8/2011 | Tozaki | 271/279 |
| 2012/0284184 | A1 * | 11/2012 | McGivney et al. | 705/43 |

* cited by examiner

*Primary Examiner* — Edwyn Labaze
(74) *Attorney, Agent, or Firm* — Ralph E. Jocke; Daniel D. Wasil; Walker & Jocke

(57) ABSTRACT

An automated banking machine operates to cause financial transfers responsive to data read from data bearing records in the form of user cards. The machine includes a printer for printing paper records of transactions conducted at the machine. The printer receives paper from a shared paper path. The shared paper path can be supplied by a first paper supply and a second paper supply. A controller is operative to switch between the paper supplies in providing paper to the printer. Based on signals received from paper sensors in the machine, the controller can determine whether the first paper supply has reached a predetermined low level. In response to a low level determination, the controller acts to cause a paper drive to begin moving paper from the second paper supply to the shared paper path and then to the printer.

20 Claims, 10 Drawing Sheets

BANKING APPARATUS OPERATED RESPONSIVE TO DATA BEARING RECORDS

CROSS REFERENCE TO RELATED APPLICATION

This application claims benefit pursuant to 35 U.S.C. §119 (e) of Provisional Application 61/402,675 filed Sep. 2, 2010, which disclosure is herein incorporated by reference.

TECHNICAL FIELD

This invention pertains to automated banking machines that operate responsive to data bearing records such as user cards, and which may be classified in U.S. Class 235, Subclass 379.

BACKGROUND OF INVENTION

Automated banking machines can include a card reader that operates to read data from a bearer record such as a user card. Automated banking machines may operate to cause the data read from the card to be compared with other computer stored data related to the bearer or their financial accounts. The machine operates in response to the comparison determining that the bearer record corresponds to an authorized user, to carry out at least one transaction which may be operative to transfer value to or from at least one account. A record of the transaction is often printed through operation of the automated banking machine and provided to the user. Automated banking machines may be used to carry out transactions such as dispensing cash, the making of deposits, the transfer of funds between accounts and account balance inquiries. The types of banking transactions that may be carried out are determined by the capabilities of the particular banking machine and system, as well as the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as at a bank to carry out financial transactions. Such transactions may include for example, the counting and storage of currency notes or other financial instrument sheets, and other types of transactions. For purposes of this disclosure, an automated banking machine, automated transaction machine, or an automated teller machine (ATM) shall be deemed to include any machine that may be used to automatically carry out transactions involving transfers of value.

Automated banking machines may benefit from improvements.

OBJECTS OF EXEMPLARY EMBODIMENTS

It is an object of an exemplary embodiment to provide an automated banking apparatus that operates responsive to data bearing records.

It is a further object of an exemplary embodiment to provide an automated banking machine.

It is a further object of an exemplary embodiment to provide an automated banking machine having a printing arrangement that is operative to print indicia on paper that minimizes the waste of paper when replacing the paper supply with a new paper supply.

It is a further object of an exemplary embodiment to provide an automated banking machine having a printing arrangement with a paper supply that can be conveniently replaced with a new paper supply when it needs to be replaced.

It is a further object of an exemplary embodiment to provide an automated banking machine having a printing arrangement in which a single printer is supplied by dual paper rolls.

Further objects of exemplary embodiments will be made apparent in the following Description of Exemplary Embodiments and the appended claims.

In an exemplary embodiment an automated banking machine that operates to cause financial transfers responsive to data read from user cards is provided. The automated banking machine includes a card reader that is operative to read card data that corresponds to a user financial account. The machine includes a cash dispenser that is operative to cause cash stored in the machine to be dispensed from the machine. At least one banking machine computer is provided in the machine and is in operative connection with the card reader and the cash dispenser. The banking machine computer is operative during a transaction to cause the card data to be read from the user card through operation of the card reader, to cause cash to be dispensed from the machine through operation of the cash dispenser and to cause the user account to be assessed a value associated with the cash dispensed. The automated banking machine further includes at least first and second paper supplies, and a printing apparatus that is selectively operative to cause the printing of indicia on paper from the first and second paper supplies. The automated banking machine also includes a paper drive that is operative to move the paper from the first and second paper supplies to the printing apparatus. The automated banking machine further includes a paper control apparatus operatively connected to the paper drive. The paper control apparatus is operative to cause the paper drive to move paper from the second paper supply to the printing apparatus when the supply of paper from the first paper supply is at a predetermined amount.

In another aspect of the exemplary embodiment, a method includes the steps of opening a door of a secure housing of an automated banking machine to allow a machine servicer access to the interior area of housing. The automated banking machine includes a card reader that is operative to read card data that corresponds to a user financial account. The machine includes a cash dispenser that is operative to cause cash stored in the machine to be dispensed from the machine. At least one banking machine computer is provided in the machine and is in operative connection with the card reader and the cash dispenser. The banking machine computer is operative during a transaction to cause the card data to be read from the user card through operation of the card reader, to cause cash to be dispensed from the machine through operation of the cash dispenser and to cause the user account to be assessed a value associated with the cash dispensed. The automated banking machine further includes at least first and second paper supplies, and a printing apparatus that is selectively operative to cause the printing of indicia on paper from the first and second paper supplies. The method further includes the steps of removing the first paper supply from the housing and mounting a third paper supply to the housing after removing the first paper supply.

Numerous types of novel systems and methods are taught by the disclosure hereof.

DESCRIPTION OF EXEMPLARY EMBODIMENTS

Figure 1:
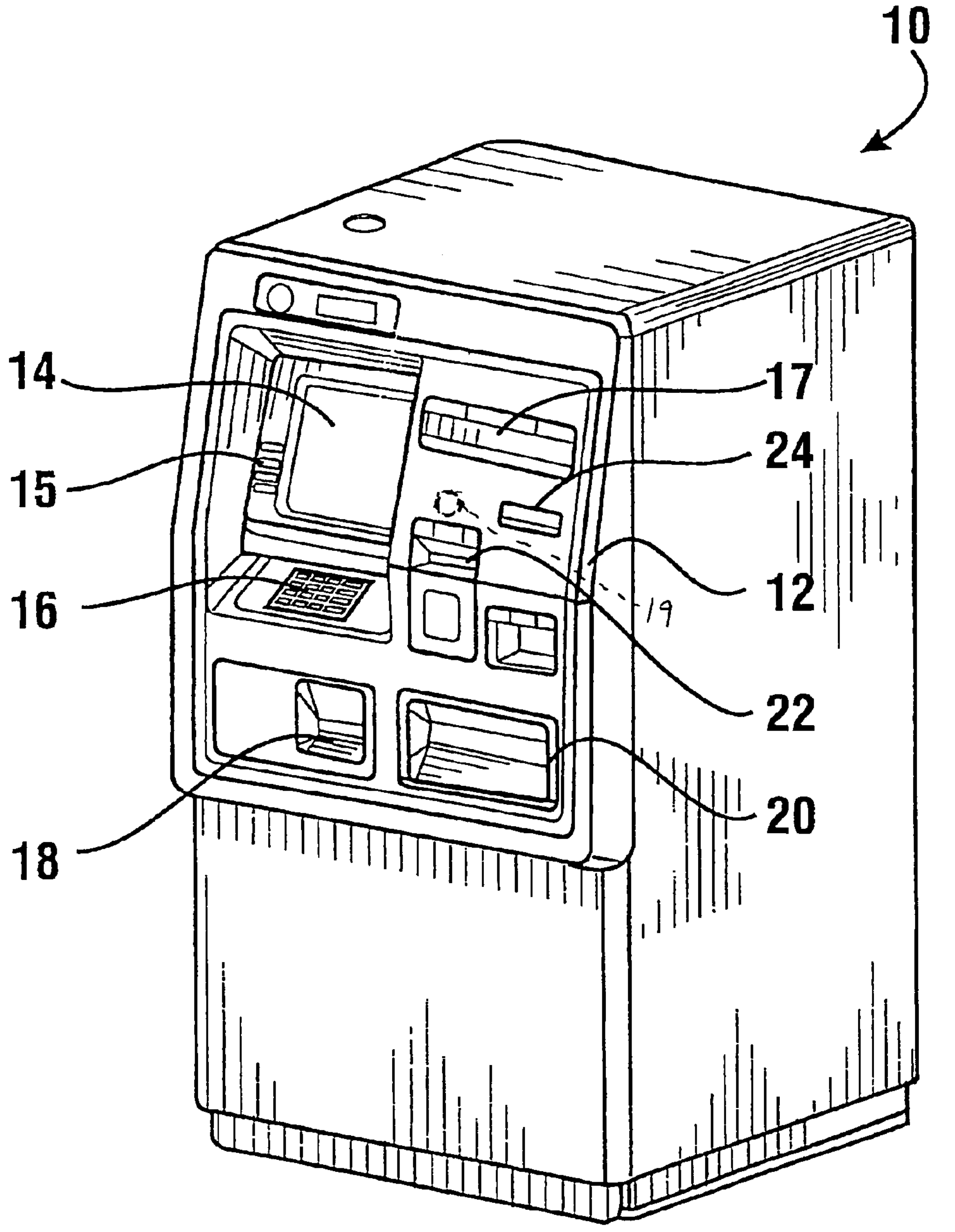
FIG. 1 is an isometric view of an exemplary automated banking machine.

Referring now to the drawings and particularly to FIG. 1, there is shown therein an exemplary automated transaction machine generally indicated 10. The exemplary embodiment comprises a self-service automated banking machine, such as an ATM. However, it should be understood that the features described herein may be used in connection with other types of automated transaction machines, including point of sale (POS) machines, vending machines, etc. In addition, while the exemplary embodiment is shown positioned within a housing of an ATM, other embodiments may be positioned within a separate housing that is electronically connected to the automated banking machine with which it is associated.

In the exemplary embodiment, ATM 10 operates to carry out transactions such as the dispensing of currency. The machine may also operate to accept deposits such as deposited sheets or envelopes. The machine may also print and dispense other types of sheets such as receipts, tickets, vouchers, stamps, account statements or other items.

ATM 10 includes a fascia 12 which includes components of a user interface. The fascia includes an opening through which a display 14 may be viewed. The display may be a CRT, LCD or other type visual display that is operative to display visual images and indicia to a user. The messages output through the display may include messages which instruct a user concerning operation of the machine. The user interface also includes a plurality of function keys 15 adjacent to the display. The user interface also includes a keyboard 16. Users are enabled to provide inputs and instructions to the machine by selectively pressing selected keys among the function keys and the keyboard.

The fascia of ATM 10 also includes openings which communicate with devices and mechanisms located within the housing of the machine. In the exemplary embodiment, a depository opening 18 is provided. Users are enabled to place deposits such as sheets or envelopes that are accepted by the machine into the depository opening in the conduct of deposit transactions. A sheet outlet opening 20 is also provided. Currency notes or other documents are presented to users in the course of cash dispense transactions through the sheet outlet opening.

The fascia 12 also includes an outlet opening 24 for papers, including printed papers. For example, the opening 24 can be used to provide users with printed receipts for transactions conducted at the machine. The user interface also includes a card entry slot 22. In the exemplary embodiment, a user is enabled to pass a card through the entry slot to initiate operation of the machine. The machine includes a card reader, schematically indicated by 19 in the interior thereof which is in communication with the card entry slot. The card reader is operative to read a magnetic stripe on a card presented by a user. The magnetic stripe of a presented card includes information which identifies a user and/or their accounts. In the exemplary embodiment, the card reader is enabled to read information included on debit cards and/or credit cards. The exemplary ATM includes at least one banking machine computer 21 (FIG. 3) that is in operative connection with the card reader and the cash dispenser. The banking machine computer 21 is operative during a transaction to cause the card data to be read from the user card through operation of the card reader, to cause cash to be dispensed from the machine through operation of the cash dispenser and to cause the user account to be assessed a value associated with the cash dispensed.

It should be understood that the input and output devices shown in the user interface are exemplary. Other embodiments may include other or different types of output and input devices. These include, for example, other types of card readers or other types of devices for reading cards or articles. It should be understood that other types of identifying cards may also be employed with automated banking machines. Such cards may include so called “smart cards” which include a programmable memory having data stored therein. Such data may include information about the user and/or their accounts. Such data may also include information representative of monetary value. Value may be deducted from the memory as the card is used to obtain value in other forms, such as by using the card to make purchases. Some cards may also have the value thereon periodically replenished such as through operation of the ATM.

Other embodiments of machines which utilize certain of the features described herein may include input devices which may read other articles, such as articles encoded with optical indicia which identify a user, an account or other information. Other input devices which may be used include devices which read inductance or radiation properties of an article. Other types of input devices may include biometric type reading devices such as fingerprint readers, retina scan devices, iris scan devices, speech recognition devices, or other types of input devices which are capable of providing an input which can be used to identify a particular user and/or a financial account.

It should be understood that the keyboard and function keys which serve as input devices in the described embodiment are exemplary. In other embodiments, other types of input devices which are capable of receiving data or instructions from a user may be used. Other types of output devices may also be used in other embodiments. These may include other types of visual and nonvisual output devices which are capable of communicating messages to a user and which can instruct the user or provide information concerning operation of the machine.

The exemplary user interface of ATM 10 may include a statement printer outlet opening 17. Statement outlet opening 17 is used for delivering sheets which comprise account statements to users of the machine. It should be understood that while in the exemplary embodiment account statements are delivered to the user through a fascia of the machine, alternative embodiments may deliver such statements to the user from a separate device, or housing that is in electronic connection with the transaction machine. For example, the computer operating in the ATM 10 may be in communication with one or more local or remote computers. Such computers may be in operative connection with one or more data stores which include data representative of transactions conducted by a user. The computer operating in the ATM may cause such data to be accessed in response to instructions from a user at the ATM. Such data may be accessed by the computer operating in the ATM or by other computers operating in or adjacent to the separate device or housing. This enables printing of the account statement requested by the user locally in proximity to the user.

Exemplary embodiments may include features described in one or more of U.S. Pat. Nos. 7,634,433; 7,631,802; 7,630,925; 7,606,767; 7,604,164; 7,595,816; 7,584,883; 7,735,723; 7,735,722; 7,712,657; and 7,658,321, the disclosures of each of which are incorporated herein by reference in their entirety.

Figure 2:
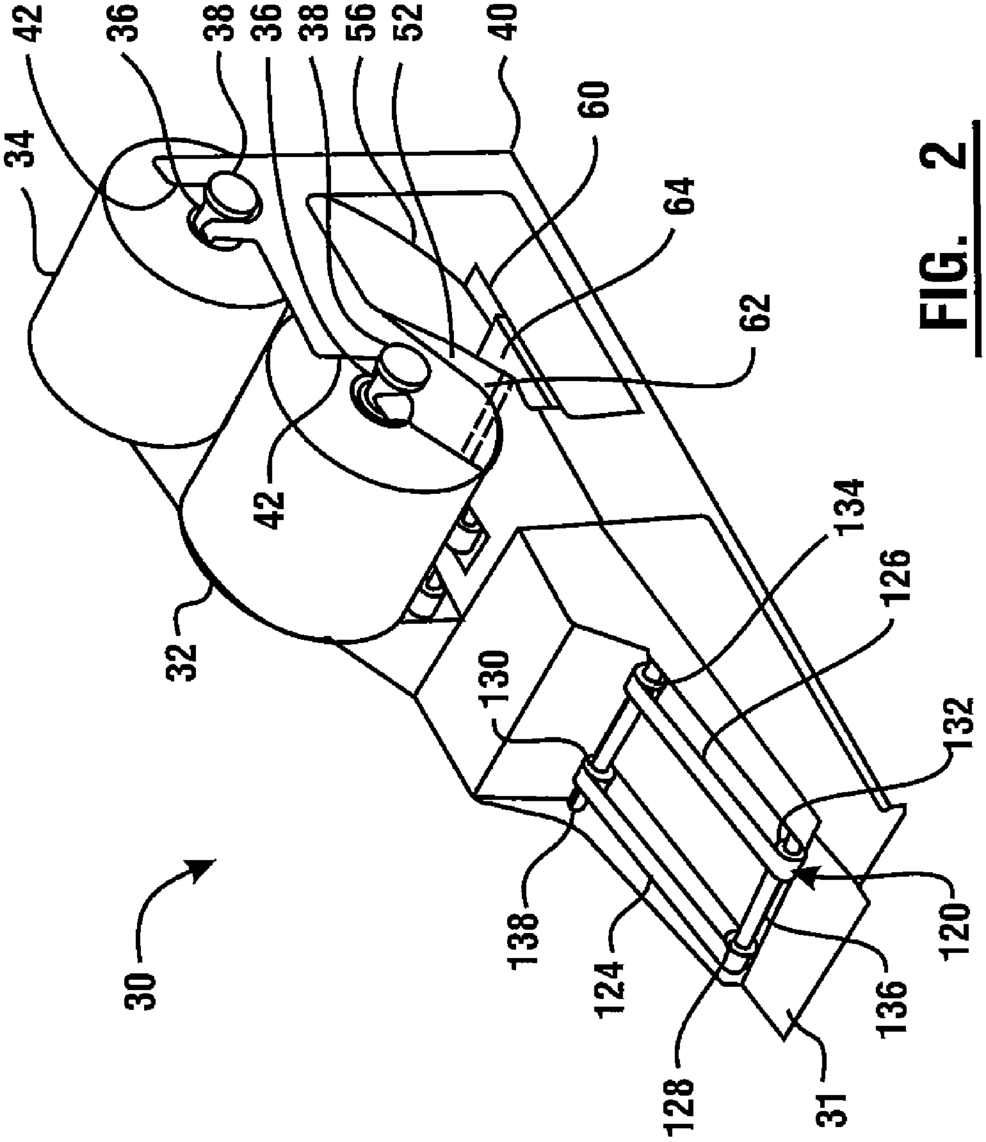
FIG. 2 is an isometric view of an exemplary printing arrangement of the exemplary automated banking machine shown in FIG. 1.
Figure 3:
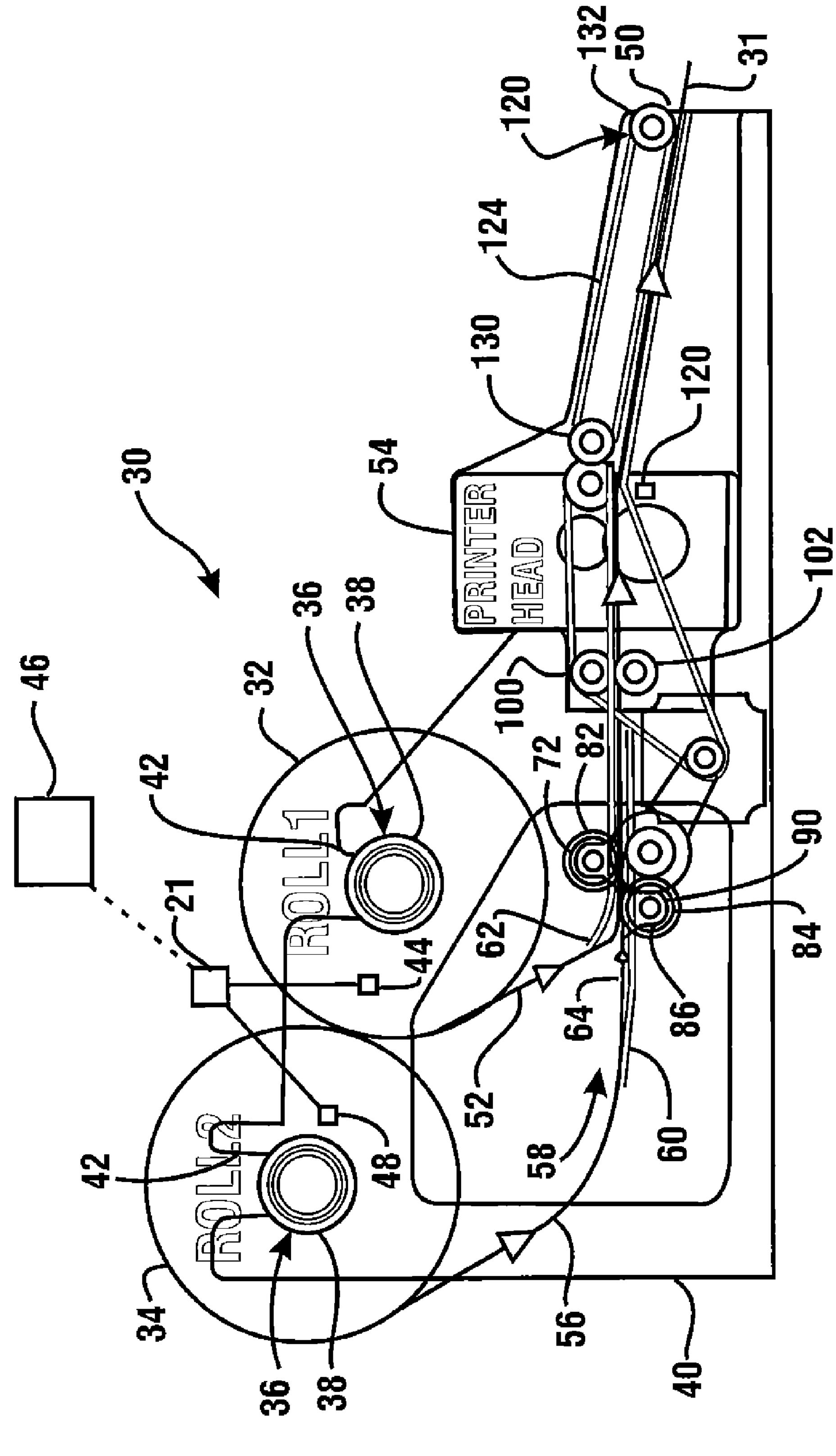
FIG. 3 is a schematic side view of the exemplary printing arrangement of FIG. 2.
Figure 4:
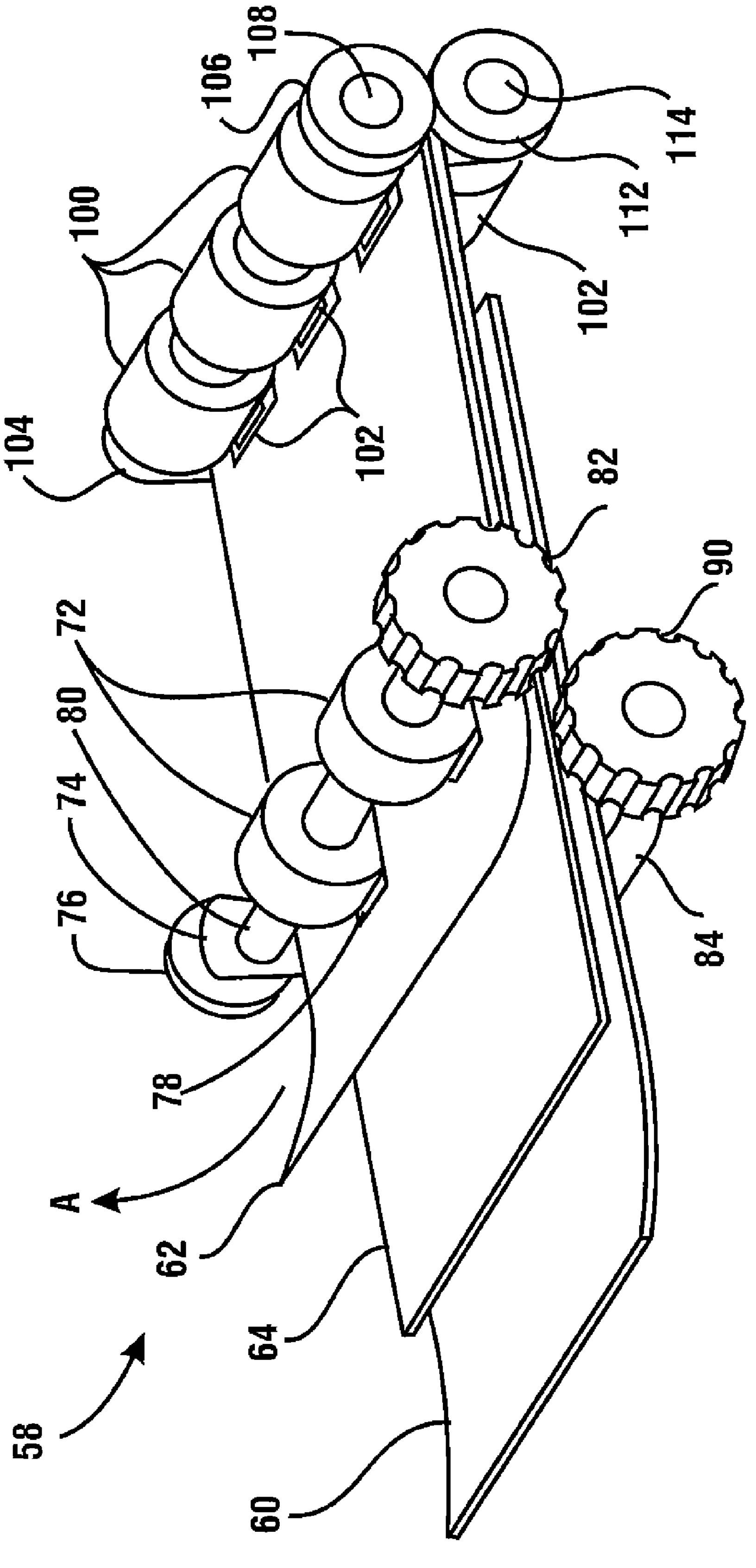
FIG. 4 is a left side isometric view of the roll transfer mechanism of exemplary printing arrangement of FIG. 2.

FIGS. 2 and 3 show an exemplary printing arrangement 30 for printing receipts inside the housing of ATM 10. The printing arrangement is operative to print indicia on paper 31 that extends in a paper path. The paper path extends from first and second supplies, which in the exemplary embodiment includes first and second paper rolls 32, 34, to the receipt opening 24 (FIG. 1). Each of the exemplary paper rolls 32, 34 includes a spool 36 with paper rolled therearound. Each spool 36 includes flanges 38 on opposite axial ends of the spool 36. The paper rolls are removably mounted in supporting connection with a housing 40 and rotate relative to the housing 40 to retract or dispense the paper. In particular, the axial ends of each spool 36 are inserted into respective grooves 42 formed in the housing 40. Each groove 42 has an open ended top to allow easy insertion and removal of the spool 36. Each flange 38 partially covers the outer side of the groove 42 and extends beyond the width of the groove 42 to laterally secure each spool 36 to the housing 40.

As represented in FIG. 3, first paper roll 32 is in operative connection with a first paper low sensor schematically indicated 44. In some embodiments sensor 44 may be operative to sense when the first paper roll 32 is in an empty or almost empty condition. Alternatively in other embodiments sensor 44 may be operative to sense when the paper roll 32 has been depleted to a certain level. Alternatively in other embodiments, multiple sensors may be positioned so as to sense the remaining paper on paper roll 32 at various levels.

Sensor 44 is in operative connection with the computer 21. The computer operates in accordance with programmed instructions which are stored in at least one data store in operative connection with the computer. The computer operates such that when sensor 44 senses that first paper roll 32 has reached a certain level, the computer operates to generate one or more signals. In the exemplary embodiment the computer may operate to cause the ATM to send one or more messages to a remote system. The remote system may operate to receive the messages and take appropriate action such as to record that the receipt paper roll is at a particular level. Alternatively or in addition the remote computer may operate to give appropriate notifications such as to notify someone at the bank that operates the ATM or an appropriate ATM servicer to make a service call to the ATM to replace the paper roll with a new roll. This may be done in some embodiments in the manner described in U.S. Pat. No. 6,279,826 the disclosure of which is incorporated herein by reference in its entirety. Of course these approaches are exemplary and in other embodiments, other approaches may be used.

In exemplary embodiments one or more sensors 44 may be sensors of various types. These may include contact sensors, photo sensors, ultrasonic sensors, infrared sensors or other sensors that are suitable for determining the level of paper included or remaining on the roll. Various types of sensors may be suitable for use in connection with the approaches described.

In the exemplary embodiment the second paper roll 34 has in operative connection therewith, one or more second paper low sensors 48. The second paper low sensor is operative to sense when the second paper roll has reached a certain level. For example sensor 48 may operate to sense when the second paper roll is at a level such that it is nearing depletion or is empty or almost empty. The at least one second paper low sensor 48 is also in operative connection with the computer 21. The computer may operate in accordance with its programming to take one or more actions responsive to signals from the one or more second paper low sensors 48. This includes operating to cause the ATM to generate one or more signals and/or messages to a remote system in a manner previously discussed.

In some exemplary embodiments computer 21 may operate in response to receiving an indication that the first paper roll has reached a certain level, to check in accordance with its programming that the second paper roll has more paper than a designated level. This may be done in accordance with computer programming and through sensing a level of paper remaining at the other roll. If the other roll is depleted or nearly depleted, signals from the sensor indicating that the first roll is nearly depleted may cause the ATM to send one or more signals to a remote system. These signals may cause the system to notify the appropriate person that replacement of the paper roll is needed at the ATM because the ATM will soon be out of receipt paper.

Further in some exemplary embodiments the at least one computer may operate to begin counting the amount of paper that has moved through the printer since a particular level of paper was sensed. For example, if the at least one sensor is operative to sense that generally a certain length of paper is remaining, the at least one computer may operate to calculate how much paper has since been used in the course of printing receipts. This may be based on the number of print lines (whether they include printing or note) the printer has moved through the printer in the course of printing. Alternatively in situations where top of form (TOF) paper is used and/or other situations where a constant length of paper is used for each receipt, the computer may operate to count the number of receipts. In this manner the computer is able to determine not only how much paper has been used since a given level was sensed, but also the amount of paper remaining. In response to the use of paper and the computer determining that certain amounts are left, the computer may operate to cause certain steps to be taken. Such steps might include, for example, the computer operating in accordance with its programming to cause the machine to query each user as to whether they want a receipt for transactions. Thus for example the operation of the machine may be adjusted so that only those users who wish to receive a receipt will have a receipt printed for them and those that do not will not receive a receipt. By modifying machine operation in this manner, the remaining amount of receipt paper can be conserved. Alternatively or in addition, additional messages may be sent to one or more remote systems indicating a more pressing need for replacement of the paper. As can be appreciated various steps may be taken.

Further as can be appreciated in situations where one paper roll is nearing depletion and another paper roll that is full or above a level is present, there may no urgency in giving an entity responsible for servicing the machine notice of a need to replenish receipt paper. Thus for example in these circumstances the computer may operate to note that the first receipt roll is nearing depletion and to operate in accordance with its programming to sense a likely depletion of the first roll so that paper can then be used from the second roll. In some embodiments the computer may operate to send one or more messages to a remote system to indicate that one of the rolls is depleted or nearing depletion. The system may operate in accordance with such messages to make a record for a responsible service entity that the next time this particular machine is serviced, at least one new receipt roll will be needed. Thus such a record may be accessed so that when a servicer responsible for this machine next conducts a service call, they can plan to have a suitable roll of receipt paper ready to install in place of the depleted or nearly depleted roll. Such a servicer may obtain such information from one or more data stores where information concerning required maintenance activities for ATMs is stored. Of course these approaches are exemplary and in other embodiments, other approaches may be used.

Returning to a description of the exemplary embodiment, the paper is delivered from the printing apparatus into a delivery area 50. A first paper web 52 extends from the first paper roll 32 to a printer 54 when paper is being supplied by the first paper roll 32. A second paper web 56 extends from the second paper roll 34 to the printer 54 when paper is being supplied from the second paper roll 34. The first and second paper webs 52, 56 extend into a roll transfer mechanism 58. The roll transfer mechanism 58 operates to transfer the supply of paper to the printer between the first paper roll 32 and the second paper roll 34. In particular, the roll transfer mechanism 58 operates to initially cause the first paper roll 32 to supply paper until the first paper roll 32 is empty. When the first paper roll 32 is empty, the roll transfer mechanism 58 operates to cause paper to be supplied by the second paper roll 34 as shown in FIG. 6, and vice versa.

Thus, an exemplary embodiment allows for an automated banking machine that comprises a dual paper roll printing arrangement which can deliver a transaction receipt using either of the paper rolls during a transaction, to the same (common, shared) receipt outlet opening to a machine user. A malfunction in the machine (e.g., a drive device malfunction) that is only associated with delivering paper from a first paper roll, will not prevent the machine from switching to the available second paper roll to still deliver paper for providing a receipt to the user. The control programming for the machine allows for a receipt that was (partially) printed using paper from the first paper roll to be reprinted using paper from the second paper roll. Thus, instead of a bank's ATM not being able to provide an important transaction receipt to a bank customer, the controlled malfunction feature of the exemplary embodiment allows the customer to still be timely provided with a receipt, without having to know about the malfunction. The dual ability of the machine can help to reduce negative experiences by bank customers. As a result, the exemplary machine can assist in improving customer loyalty to bank.

Figure 5:
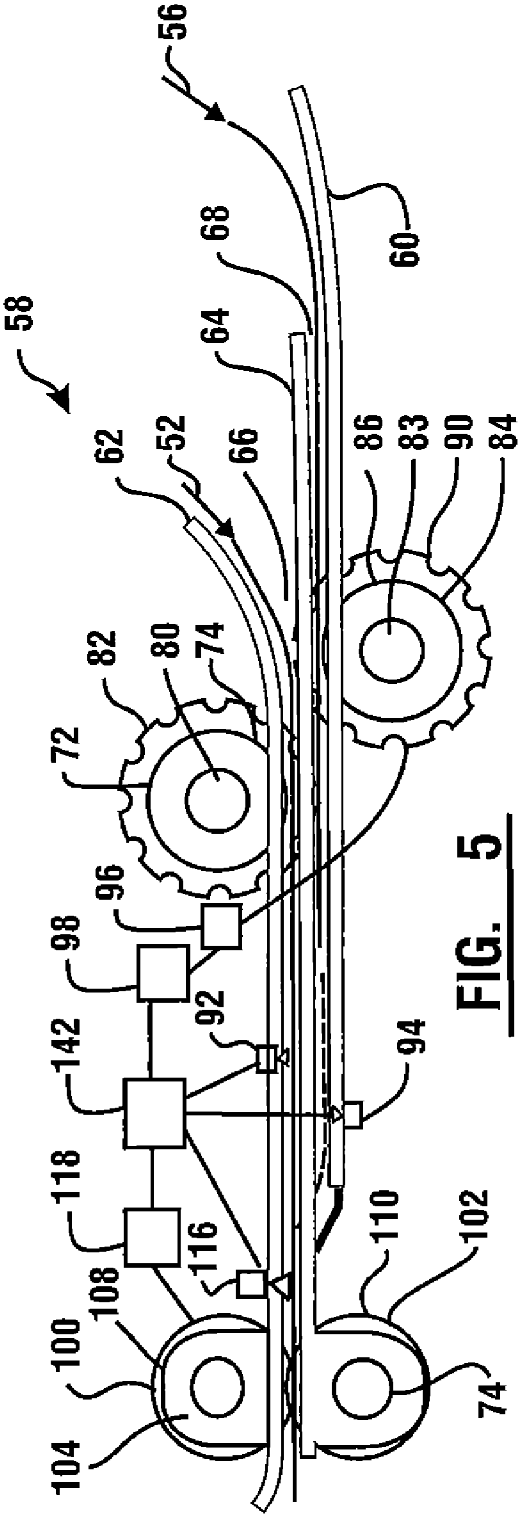
FIG. 5 is a right side view of the roll transfer mechanism of FIG. 4.
Figure 6:
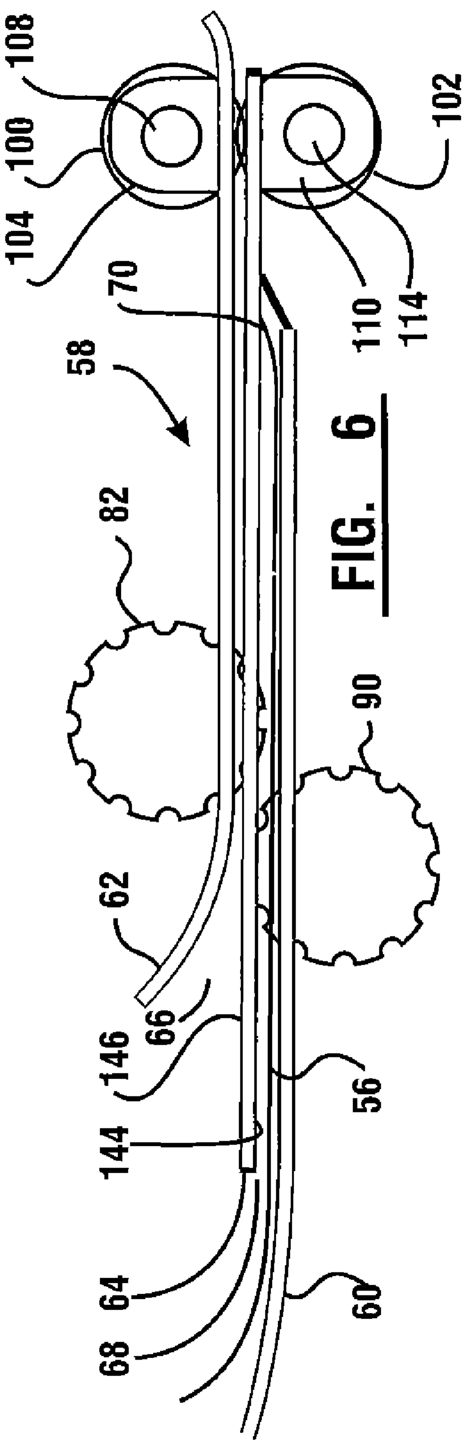
FIG. 6 is a left side view the roll transfer mechanism of FIG. 4.

As best seen in FIGS. 3-6, the exemplary roll transfer mechanism 58 includes a lower platen 60, an upper platen 62, and a medial platen 64, which is positioned between the lower and upper platens. That is, the paper handling arrangement 58 (or paper merger) includes a center wall section substantially equally spaced between outer wall sections, where the spacing forms two respective paper paths. The upper platen 62 and medial platen 64 define an upper passage 66 therebetween (FIGS. 5 and 6) that receives the first paper web 52. The lower platen 60 and the medial platen 64 define a lower passage 68 therebetween (FIGS. 5 and 6) that receives the second paper web 56. The paper 56 in the lower passage 68 merges (flows) into the upper passage 66 via an opening or paper merge slot 70 (FIG. 6) in the medial platen 64. The lower platen 60 includes an upwardly curving (sloped or slanted) section 63 (paper guide) that guides the paper 56 upward into and through the opening/slot 70. As can be seen in FIGS. 5 and 6, in a paper travel direction after the opening 70 there becomes a common (shared) paper path for both of the papers 52, 56. This shared path is located between the upper platen 62 and the center 64 platen. Thus, the shared path can be viewed as a part of (or an extension of) the upper passage 66. The printer 54 is located downstream of the shared path, which is located downstream of the paper merge slot 70.

It should be understood that in other exemplary roll transfer mechanisms, the opening 70 can be used to allow the paper 52 in an upper passage to merge (flow) into a lower passage. That is, an upper platen can be similarly configured to include a downwardly curving section that guides paper 52 downward into and through the opening 70. A shared paper path would be between the lower and center platens. It should be understood that the lower platen 60 includes an upwardly curving (sloped or slanted) section (paper guide) that guides the paper 56 upward into and through the opening/slot 70.

In an exemplary embodiment the paper flows substantially horizontally in the paper paths. However, it should be understood that the handling arrangement 58 can also be oriented so that papers flow substantially downward (or upward or angled) through the paper paths.

The paper handling arrangement 58 further includes two upper feed wheels 72 that are rotatably mounted in supporting connection with the ATM housing. Specifically, a pair of supports 74 extend from the upper platen 62 at opposite lateral sides of the upper platen 62. Each exemplary support 74 is an inverted U-shape (as viewed from FIG. 4) and extends upwardly from the upper platen 62. A washer 76 (or fastener) is positioned outwardly adjacent a support 74. The upper feed wheels 72 are positioned between the supports 74 and extend partially below the upper platen 62 through corresponding openings 78 in the upper platen 62. A shaft 80 extends through the upper feed wheels 72, supports 74, and washer 76 (e.g., locking washer). The shaft 80 is engaged with the upper feed wheels 72 to rotatably support the upper feed wheels 72 on the upper platen 62.

A knob 82 is fixed to the shaft 80 at a location outwardly adjacent the support bearing 74, which is opposite the support bearing 74 adjacent the washer 76. The knob 82 is manually rotatable to feed the first paper web 52 through the upper passage 66. In the exemplary embodiment the upper feed wheels 72 are comprised of resilient material which provides relatively high frictional engagement between the paper and the feed wheels. The feed wheels are sized so that the paper web can be extended between the feed wheels and the medial platen 64 in sandwiched relation. In some embodiments suitable minor deformation of the feed wheels in the area of engagement with the paper web is operative to cause sufficient engaging force to be applied to the paper web through manual rotation of the knob 82. Further in the exemplary embodiment the force of engagement is not so great so as to impede movement of the paper in response to operation of the printer to move the paper, or to cause high resistance or tearing of the paper web. Of course these approaches are exemplary and in other embodiments other approaches may be used.

The exemplary paper handling arrangement 58 also includes two lower feed wheels 84 that are rotatably mounted in supporting connection with the lower platen 60. Specifically, a pair of supports 86 is secured to the lower platen 60 at opposite lateral sides of the lower platen 60. Each support 86 is U-shaped (as viewed from FIG. 3) and extends downwardly from the lower platen 60. A washer is positioned outwardly adjacent a support 86. The lower feed wheels 84 are positioned between the supports 86 and extend partially above the lower platen 60 through corresponding openings in the lower platen 60. A shaft 88 extends through the lower feed wheels 84, supports 86, and washer. The shaft 88 is operatively engaged to the lower feed wheels 84 to rotatably mount the lower feed wheels 84 in supporting connection with the lower platen 60. A knob 90 is fixed to the shaft 88 at a location outwardly adjacent the support 86, which is opposite the support 86 adjacent the washer. The knob 90 is manually rotatable to feed the second paper web 56 through the lower passage 68. In the exemplary embodiment the lower feed wheels 84 are similar to the upper feed wheels 72 and are comprised of resilient material. The lower feed wheels are operative to engage the lower paper web in sandwiched relation between the feed wheels and the lower surface of the medial platen. Of course these approaches are exemplary and in other embodiments other approaches may be used.

Referring to FIG. 5, at least one first paper presence sensor 92 is located in the upper passage 66 and upstream of the opening 70 for sensing the presence of the first paper web 52. At least one second paper presence sensor 94 is located in the lower passage 68 and upstream of the opening 70 for sensing the presence of the second paper web 56. The upper and lower feed wheels 72, 84 are rotated by a gear clutch mechanism 96. The gear clutch mechanism 96 is driven by at least one stepper motor 98. The stepper motor is operated in response to one or more computers. Sensors 92 and 94 are also in operative connection with the at least one computer. The at least one computer may include computer 21 in some embodiments. Alternatively the computer may include one or more separate processors which operate in accordance with programmed instructions stored in one or more data stores. The at least one computer operates to cause the automated banking machine to move the paper in the manner described hereafter.

When the first paper roll 32 is not empty, the gear clutch mechanism 96 operatively engages the upper feed wheels 72, so that the stepper motor 98 drives only the upper feed wheels 72. Then, when the first paper roll 32 is empty, the computer operates to cause gear clutch mechanism 96 to engage the lower feed wheels 84, so that the stepper motor 98 drives the lower feed wheels 84 to move the second paper web 56 to the printer 54.

The exemplary paper handling arrangement 58 includes three pairs of opposed upper and lower rollers 100, 101 that are located downstream of the opening 70 in the medial platen 64. The upper and lower 100, 101 rollers are rotatably mounted, respectively, in operatively supported relation with the upper and medial platens 62, 64. In particular, for the upper rollers 100, a pair of supports 104 are operatively engaged with the upper platen 62 at opposite lateral sides of the upper platen 62. Each support 104 is inverted U-shaped (as viewed from FIGS. 4-6) and extends upwardly from the upper platen 62. A washer 106 is positioned outwardly adjacent a support 104. The upper rollers 100 are positioned between the supports 104 and extend partially below the upper platen 62 through corresponding openings 102 in the upper platen 62. A shaft 108 extends through the upper rollers 100, supports 104, and washer 106. The shaft 108 is in operative engagement with the upper rollers 100 to rotatably mount the upper rollers 100 to the upper platen 62.

For the lower rollers 101, a pair of supports 110 is in operatively supported connection with the medial platen 64 at opposite lateral sides of the medial platen 64. Each support 110 is U-shaped (as viewed from FIGS. 4-6) and extends downwardly from the medial platen 64. A washer 112 is positioned outwardly adjacent a support 110. The lower rollers 101 are positioned between the supports 110 and extend partially above the medial platen 64 through corresponding openings in the medial platen 64. A shaft 114 extends through the lower rollers 101, supports 110, and washer 112. The shaft 114 is in operative engagement with the lower rollers 101 to rotatably mount the lower rollers 101 to the medial platen 64.

At least one third paper presence sensor 116 (FIG. 5) is located in the paper path downstream of the opening 70 for sensing a paper web in the path. In the exemplary embodiment rollers 100 and 101 are comprised of resilient material so as to engage a paper web therebetween in firmly engaged relation. In exemplary embodiments the rollers may be comprised of suitable rubber or other materials that deform slightly and move the paper in generally nonslipping engagement. Of course these structures are exemplary and in other embodiments other structures may be used.

At least one stepper motor 118 is operatively connected to the upper and lower rollers 100, 101. The stepper motor 118 operates responsive to one or more computers to selectively rotate the rollers 100, 101 to move the first or second paper web, engaged between the rollers, in a controlled manner. Of course in other embodiments other drives or structures for achieving controlled movement of paper may be used.

As seen in FIG. 3, located downstream of the third pair of feed wheels is a cutter schematically indicated 120. The cutter 120 is positioned adjacent to the paper path in printer 54. The cutter 120 is selectively operative to transversely cut the generally continuous paper web into sheets. In the exemplary embodiment the cutter comprises a blade or other suitable device which moves to selectively engage and transversely cut the paper. The cutter may be operated by a suitable drive such as a solenoid or a motor that causes the blade to selectively move and sever the web. Of course these structures are exemplary and in other embodiments other structures may be used.

A presenter drive 122 is operative to engage the paper prior to cutting. After the paper has been cut, the presenter drive 122 is operative to selectively move the paper sheet (e.g., transaction receipt) toward the delivery area 50. Alternatively, the presenter drive 122 may first engage the paper after it has been cut. The delivery area 50 is adjacent to receipt opening 24. The presenter drive 122 enables extending the paper through the receipt opening so that it can be accessed by a user. As seen in FIGS. 2 and 3, the exemplary presenter drive 122 may include first and second belts 124, 126 that are spaced transversely with respect to the paper path. The first belt 124 is journaled on a pair of rollers 128, 130, and the second belt 126 is journaled on a pair of rollers 132, 134. One shaft 136 is received by two transversely spaced rollers 128, 132 and another shaft 138 is received by the remaining two transversely spaced rollers 130, 134. The rollers may be driven by a motor (not shown) or other suitable drive. Rotation of the rollers moves the belts. The motor of the drive that operates to move the belt is operated responsive to signals from one or more computers or processors in the ATM. The paper is engaged between the belts 124, 126 and a platen 140 and is moved to the receipt opening 24 by movement of the belts.

It should further be understood that the receipt opening 24 may have adjacent thereto a suitable gate or other mechanism which prevents access through the opening except when the machine is delivering receipts to a user. Alternative embodiments may include additional mechanisms such as devices for accumulating sheets into a stack and presenting the stack to a user of the machine.

As seen in FIG. 5, the printing arrangement has associated therewith a computer schematically indicated and referred to as a controller 142. In an exemplary embodiment, the controller 142 includes a microprocessor. The microprocessor is in operative connection with a memory. The memory may be a semi-conductor memory or firmware. However, in other embodiments other types of memories may be used. This computer memory may include, for example, magnetic or optical storage or other suitable storage media that operates to store instructions that can be executed by the microprocessor. The exemplary controller 142 which operates the receipt transport and retrieval system, may also operate the printer 54 and control the printing of the receipt forms. In other exemplary embodiments separate controllers for the printer and the receipt transport and retrieval system may be used.

In the exemplary embodiment the first, second and third paper presence sensors 92, 94, 116 are in operative connection with the controller 142. The stepper motors 98, 118 are operatively connected to the controller 142. The controller 142 is operative responsive at least in part to signals from the sensors to control the motors 98, 118.

An operation of the exemplary printing arrangement 30 for printing receipts inside the housing of ATM 10 will now be discussed. FIGS. 2, 3, and 5 show the printing arrangement 30 before the printing of a receipt with the paper rolls 32, 34 full of paper. In this state, the first paper web 52 extends into the upper passage 66. The first paper web 52 is engaged between the upper feed wheels 72 and upper side 144 (FIG. 6) of the medial platen 64, and also between the upper and lower rollers 100, 101. In this condition, the second paper web 56 extends into the lower passage 68 and is engaged between the lower feed wheels 84 and the lower side 146 (FIG. 6) of the medial platen 64.

In an alternative exemplary embodiment, the lower feed wheels 84 can be arranged between the medial platen 64 and the lower platen 60. For example, the lower platen 60 can have a curved segment that dips below the lower feed wheels 84. As a result, the lower feed wheels 84 then cause the second paper web 56 to engage the upper side of the lower platen 60. The paper 56 would still enter through the lower passage 68 and exit through the opening 70 in the center platen 64.

When a printing operation is executed, the first paper presence sensor 92 senses the presence of the first paper web 52 and outputs one or more signals to the controller 142. The controller 142 processes such signals and outputs one or more control signals to the stepper motor 98 to drive the gear clutch mechanism 96 to drive the upper feed wheels 72. The upper feed wheels 72 rotate in the direction of arrow A (FIG. 5) to move the first paper web 52 along the upper passage 66 toward the printer 54. Simultaneously, the upper and lower rollers 100, 101 are rotated by the stepper motor 118 to move the first paper web 52 to the printer 54. After the printing of the receipt, the cutter 120 is operated responsive to signals from the controller to transversely cut the first paper web 52 into a receipt sheet. The presenter drive 122 then operates responsive to the controller, to cause the engaged cut receipt sheet to be selectively moved toward the delivery area 50.

Subsequent printing operations will occur in this manner until the first paper web 52 is no longer sensed by sensor 92 present in the upper passage 66. This situation indicates that the first paper roll 32 is empty or is otherwise not supplying paper for printing. When the first paper presence sensor 92 does not sense the presence of the first paper web 52, the first paper presence sensor 92 outputs one or more signals to the controller 142. The controller 142 processes this signal and outputs one or more control signals to the stepper motor 98 to drive the gear clutch mechanism 96 to drive the lower feed wheels 84. The lower feed wheels 84 rotate in the direction of arrow B (FIG. 5) to move the second paper web 56 along the lower passage 68 and through the opening 70 to the upper and lower rollers 100, 101 as also seen in FIG. 6. The upper and lower rollers 100, 101 engage the second paper web 56 and are also rotated (in respective arrow directions A and B) by the motor 118 to move the second paper web 56 to the printer 54. After the printing of the receipt, the cutter 120 is operated to transversely cut the second paper web 56 into a receipt sheet. The presenter drive 122 then operates to cause the engaged receipt to be selectively moved to the delivery area 50.

When the second paper presence sensor 94 no longer senses the presence of the second paper web 56 and the first paper presence sensor 92 still does not sense the presence of the first paper web 52, the second paper presence sensor 94 outputs one or more signals to the controller 142. The controller 142 processes these signals and outputs one or more control signals to the stepper motor 98 to stop operating the lower feed wheels 84.

Alternatively, the controller 142 may also be operatively connected to first paper low sensor 44 to operate the upper and lower feed wheels in conjunction with the first and second paper presence sensors 92, 94. For example, when the first paper low sensor 44 outputs signals to the controller 142 representing that the first paper roll 32 is not empty and the first paper presence sensor 92 outputs a signal to the controller 142 indicating the presence of the first paper web 52, the controller 142 processes these signals and outputs control signals to the stepper motor 98 to operate the upper feed wheels 72. Then, when the first paper low sensor 44 outputs signals to the controller 142 representing that the first paper roll 32 is empty and the first paper presence sensor 92 outputs signals to the controller 142 indicating the absence of the first paper web 52, the controller 142 processes these signals and outputs a control signal to the stepper motor 98 to operate the lower feed wheels 84.

In the exemplary embodiment, the controller may operate to cause paper to be switched from the second roll to the first roll. For example when the printer is being fed by paper feeding through the lower passage 68 from the second roll, a service person may replace the paper on the first roll and extend it into the upper passage 66. The service person may extend the paper from the newly replaced first roll in the upper passage by manually turning the knob 80. Thus the paper may be fed into the upper passage until it is sensed by sensor 92. In some exemplary embodiments the at least one controller may be in operative connection with indicators such as lights, graphical displays or other indicators so as to indicate to a servicer the process for placing the replacement paper in condition and also to indicate to the servicer when the paper has been moved to a suitable position so that it is sensed as present by the controller. Further it should be understood that in exemplary embodiments additional sensors may be provided in the paper path so as to facilitate sensing the position of the paper.

As a result, the printer may operate to print receipts using the web from the second roll until the paper thereon is depleted. Upon the controller sensing the depletion or near depletion of the paper from the second roll, the controller is operative to determine that paper is available from the replenished first roll. The controller then operates to cause the upper feed wheel 72 to be moved so as to again cause paper moving through the upper passage to be fed into the printer. Of course it should be appreciated that this process may be repeated so that the controller may be operative to cause the paper that is fed to the printer to be readily automatically changed from the first paper roll to the second paper roll and vice versa. Of course these approaches are exemplary and in other embodiments, other approaches may be used.

As previously mentioned, when the first and second paper low sensors 44, 48 sense that their respective first and second paper rolls 32, 24 are at a certain level, they output one or more signals to the computer 21 which operates in accordance with its programming to send one or more messages to the remote computer 46, which indicates that the one or both paper rolls are empty and need to be replaced. Alternatively, the first and second paper presence sensors 92, 94 may be used instead of the first and second paper low sensors to cause one or more signals to the computer 21 that their respective paper rolls are empty. Also in some embodiments, the banking machine computer 21 may be used instead of the controller 142 to operate the paper handling arrangement 58.

When the first paper roll 32 is empty or otherwise needs to be replaced, a message regarding this condition may be sent by the ATM 10 to the remote computer 46. In the exemplary embodiment the remote computer 46 is operative to notify an appropriate service person in accordance with its programming of the need to replenish the receipt paper within the machine. As previously discussed a service person may be instructed to immediately replenish the paper supply in the machine by making a service call to the machine. Alternatively the system may operate to create a record in a data store of the need to replenish the paper. The service person who then does the next service call on the machine for other purposes such as to replenish cash or otherwise perform another function, may access the record or otherwise be informed when they are dispatched via one or more electronic messages through operation of the system to perform that function, of the need to replace the paper. Alternatively or in addition the system may operate to wait until one or more messages are received from the ATM to produce one or more messages or records indicating that the current roll has reached a level where it will soon be depleted. At this point a servicer will then be dispatched to replace the receipt paper in the machine. This will include, for example, replacing the receipt paper rolls so that two new rolls are included in the machine. Of course these approaches are exemplary.

A service person arriving at the machine will first need to gain access to the area of the machine that includes the receipt printer and the paper roll that needs to be replaced. To remove the first paper roll, the service person opens the housing of the machine such as by unlocking and opening a door of an upper housing. In an exemplary embodiment the upper housing may be positioned above a secure chest which holds the currency that is dispensed from the machine. The service person is then enabled to gain access to the interior of the housing. The service person then grasps the spool 36 of the empty first paper roll and lifts the spool up and out of the grooves 42 of the housing. The service person then rotatably mounts a new paper roll in supporting connection with the housing by inserting the new spool into the grooves 42 such that the flanges 38 of the spool partially covers the outer side of their respective grooves 42. The service person then feeds the paper web in the upper passage to the upper feed wheels 72 by manually rotating the knob 82 to feed the paper web through the upper feed wheels 72 so it is sensed by sensor 92. As previously discussed some exemplary embodiments may include indicators or other suitable devices for guiding a servicer in threading the web into the transfer mechanism. If when replacing the roll the printer is receiving paper through the lower passage from the second roll, the service person may need to take no further action other than to extend the paper to the point where it is sensed by the sensor. As a result in this position the controller will operate upon depletion of the second roll to then feed paper from the first roll. Alternatively if the receipt printer is out of paper from both rolls, the service person may manually feed the paper using the knob until it is sensed by the sensor 116. The controller may then operate in accordance with its programming to operate the motor so as to feed the paper into the printer. In the exemplary embodiment the printer may operate to conduct a printing test by feeding the paper and printing a test receipt which is then extended from the machine. This helps to assure that the printer is operating properly.

A similar process is used when replenishing paper from the second roll. This is accomplished by removing the depleted spool and installing the new paper roll in supported connection with the housing. The paper from the second roll can then be extended into the lower passage and then moved by manually turning the knob 90 so as to engage the paper with the lower feed wheels and move it therewith until it is sensed by the sensor 94. Of course as previously discussed in some embodiments indicators such as lights, graphical displays or other suitable outputs may be used to guide the service person in moving the paper into the proper position. Once the service person has completed the installation of the paper, they then perform any other activities that they may need to perform in the upper housing of the machine. This may include for example in some embodiments removing user cards that have been captured by the machine, performing testing functions or doing other things as appropriate for the particular service call. The service person will generally perform several activities at the ATM while performing a service call. Then, the service person closes and locks the door of the housing of the ATM.

Figure 7:
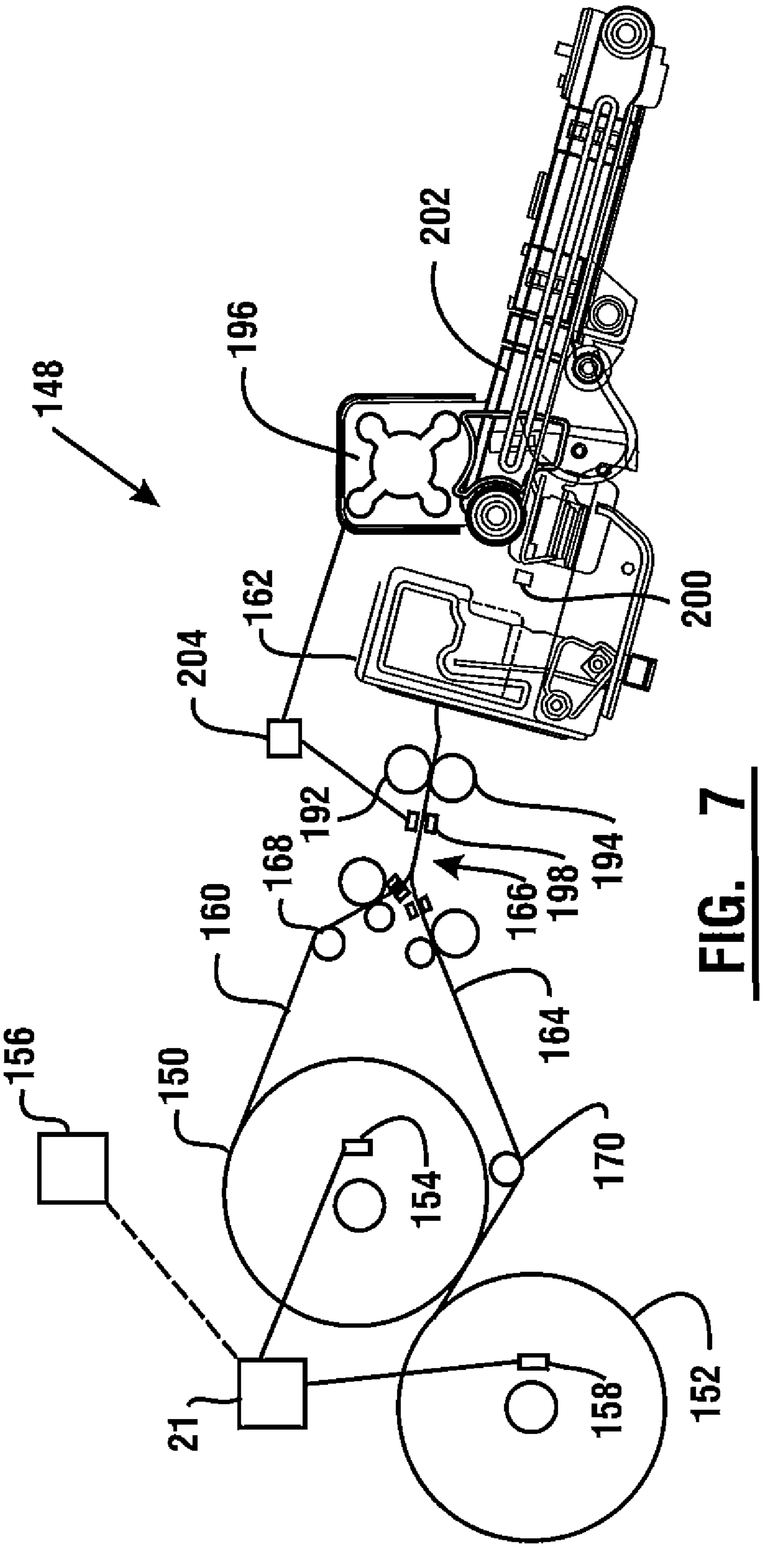
FIG. 7 is a schematic side view of an alternative exemplary printing arrangement of the exemplary automated banking machine shown in FIG. 1.
Figure 8:
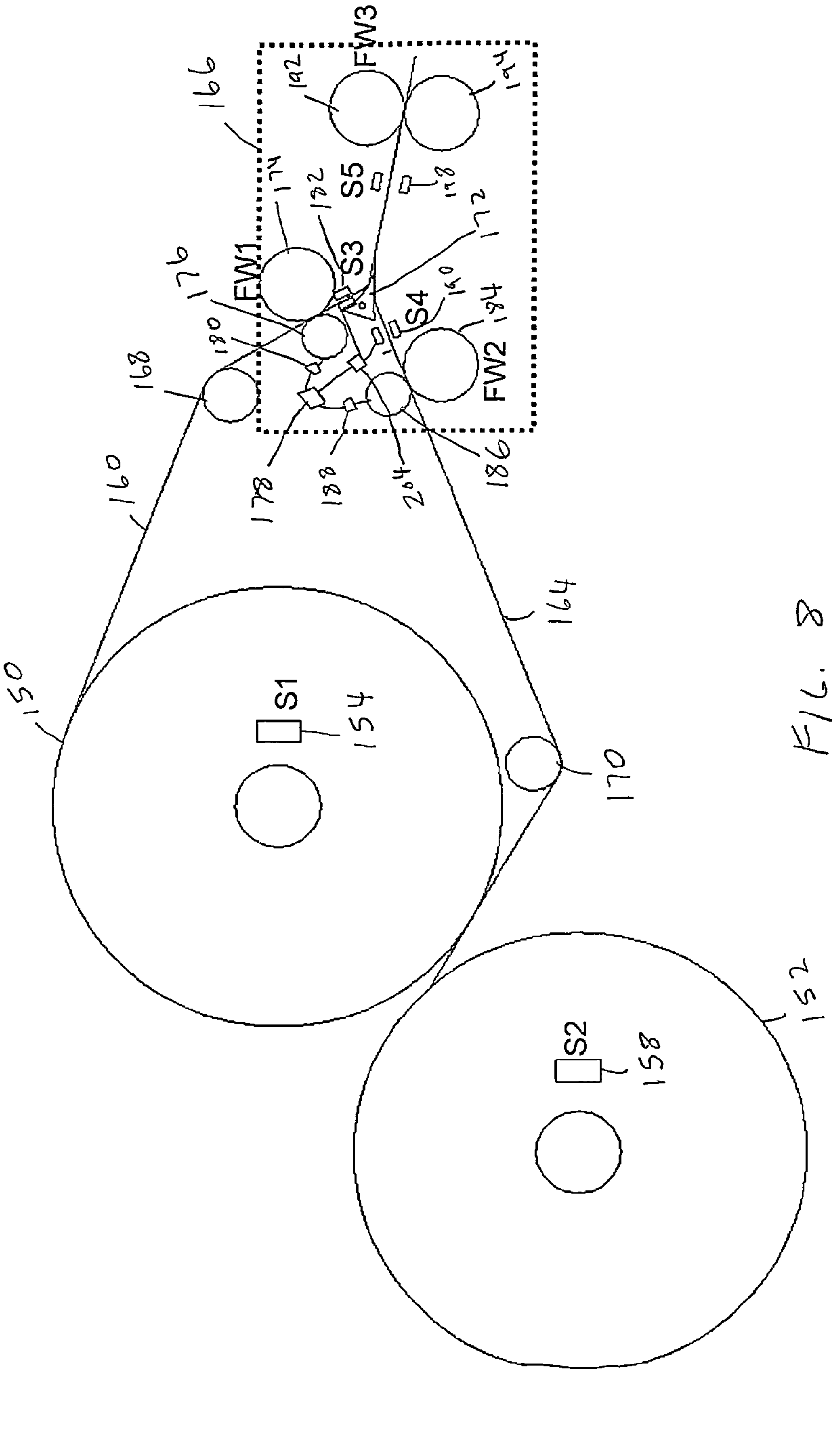
FIG. 8 is schematic side view of a portion of the exemplary printing arrangement of FIG. 7.
Figure 9:
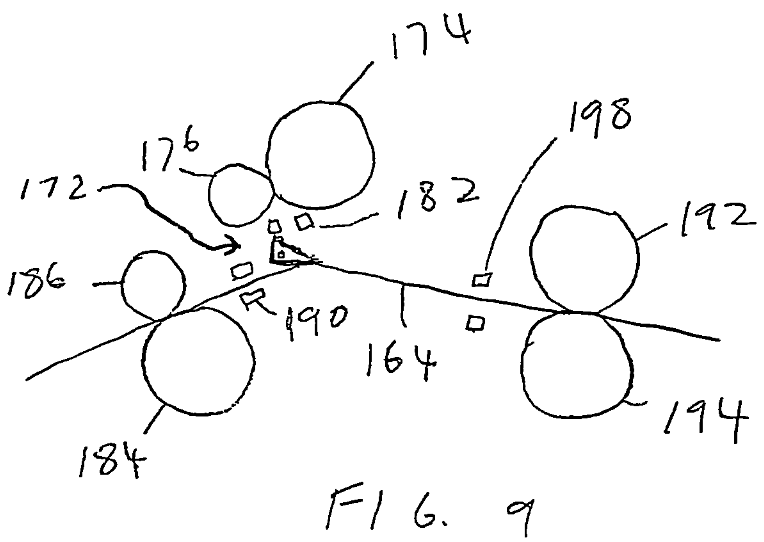
FIG. 9 is a schematic side view of the roll transfer mechanism of the exemplary printing arrangement of FIG. 7.

FIGS. 7-9 show an alternative exemplary printing arrangement 148 for printing receipts inside the housing of ATM 10. The printing arrangement is operative to print indicia on paper that extends in a paper path. The paper path extends from first and second supplies, which in the exemplary embodiment includes first and second paper rolls 150, 152. The paper rolls 150, 152 may be rotatably mounted to the ATM in a similar manner and configuration as the paper rolls 32, 34 in the previously mentioned exemplary printing arrangement 30. The first paper roll 150 is in operative connection with a first paper low sensor 154 for sensing when the first paper roll is empty. Alternatively, the first paper low sensor 154 may sense when the first paper roll 150 is at a predetermined low level. Referring to FIG. 7, the first paper low sensor 154 may be operatively connected to the computer 21 of the ATM which is in operative communication with a remote system 156, which can be similar to the previously discussed remote system 46. The second roll 152 is in operative connection with a second paper low sensor 158 for sensing when the second paper roll 152 is empty or (alternatively)

is at a predetermined low level. The second paper low sensor 158 may also be operatively connected to the computer 21 of the ATM.

The paper is delivered from the printing apparatus 148 to the delivery area 50. A first paper web 160 extends from the first paper roll 150 to a printer 162 when paper is being supplied by the first paper roll 150. A second paper web 164 extends from the second paper roll 152 to the printer 162 when paper is being supplied by the second paper roll 152. The first and second paper webs 160, 164 extend into a roll transfer mechanism 166 before reaching the printer 162.

The roll transfer mechanism 166 operates to transfer the supply of paper to the printer from the first paper roll 150 to the second paper roll 152, and vice versa. In particular, the roll transfer mechanism 166 operates to initially allow only the first paper roll 150 to supply paper until the first paper roll 150 is depleted/low and then operates to supply paper from the second paper roll 152. The first paper web 160 engages a first idler 168 before reaching the roll transfer mechanism 166, and the second paper web 164 engages a second idler 170 before reaching the roll transfer mechanism 166. The first idler 168 is provided to overcome the resistance to feeding of the first paper web 160 into the roll transfer mechanism 166. The second idler 170 is likewise provided to overcome the resistance to feeding of the second paper web 164 into the roll transfer mechanism 166.

Referring to FIG. 8, the exemplary roll transfer mechanism 166 includes a transfer gate 172 that is movably mounted in operatively supporting connection with the housing of the ATM 10. The transfer gate 172 pivots between a first position and a second position. In an exemplary arrangement, pivot of the gate 172 is controlled by a processor that operates a motor that drives the gate to move. In an alternative exemplary arrangement the transfer gate 172 freely pivots.

Figures 10, 11, 12:
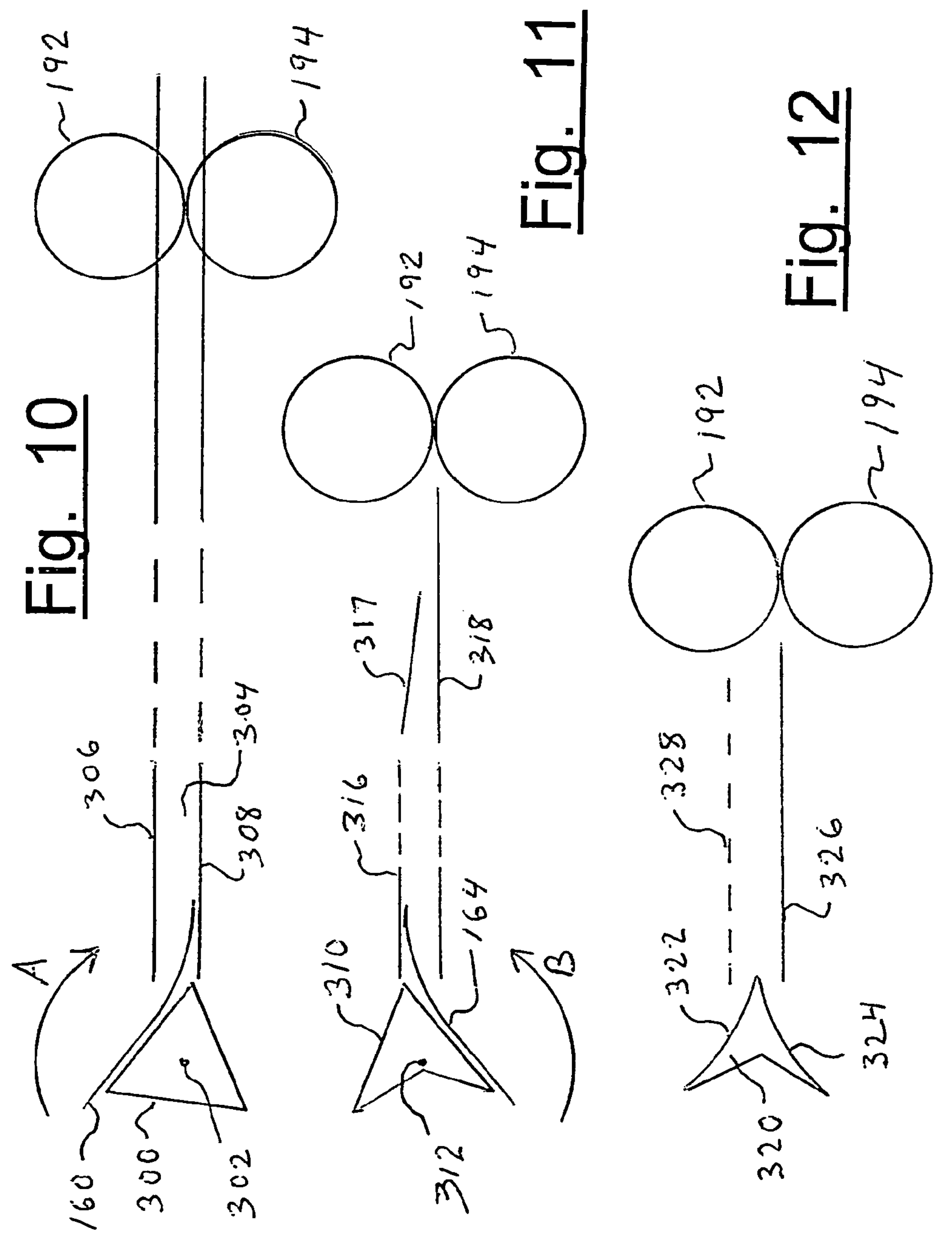
FIG. 10 shows a transfer gate in a pivoted orientation for first roll paper.
FIG. 11 shows an alternative transfer gate in a pivoted orientation for second roll paper.
FIG. 12 shows an alternative transfer gate that remains stationary for guiding both first and second roll paper.

In the first position as shown in FIGS. 7 and 8, the transfer gate 172 allows the first paper web 160 to move along the paper path to the printer 162. In the second position as shown in FIG. 9, the transfer gate 172 allows the second paper web 164 to move along the paper path to the printer 162. FIGS. 10-12 show some shapes and orientations that a transfer gate can have. Also, in other embodiments suitable fixed or movable guides may alternatively be used instead of a transfer gate.

The exemplary roll transfer mechanism 166 also includes at least one pair of opposing first feed wheels 174, 176 located (FIG. 8) operatively between the transfer gate 172 and the first idler 168. The first paper web 160 is inserted between the first feed wheels 174, 176. The first feed wheels 174, 176 are operative to engage the first paper web 160 and move it to the printer 162. A stepper motor 178 is operatively connected to the first feed wheels 174, 176 via a one way clutch 180. When driven in the forward direction, the stepper motor 178 is operative to rotate the first feed wheels 174, 176 to move the first paper web 160 to the printer 162. A first paper presence sensor 182 is positioned between the first feed wheels 174, 176 and the transfer gate 172. The first paper presence sensor 182 senses the presence of the first paper web 160 in the paper path adjacent thereto.

The roll transfer mechanism 166 also includes at least one pair of opposing second feed wheels 184, 186 operatively located (FIG. 8) between the transfer gate 172 and the second idler 170. The second paper web 164 is inserted between the second feed wheels 184, 186. The second feed wheels 184, 186 are operative to engage the second paper web 164 and move it to the printer 162. The stepper motor 178 is also operatively connected to the second feed wheels 184, 186 via a one way clutch 188. When driven in the reverse direction, the stepper motor 178 is operative to rotate the second feed wheels 184, 186 to move the second paper web 164 to the printer 162. A second paper presence sensor 190 is positioned between the second feed wheels 184, 186 and the transfer gate 172. The second paper presence sensor 190 senses the presence of the second paper web 164 adjacent thereto. In an exemplary arrangement, the initial reverse operation of the stepper motor 178 also causes any remaining portion of the first paper web 160 to be retracted toward (and onto) the first paper roll 150.

The roll transfer mechanism 166 also includes at least one pair of opposing third feed wheels 192, 194 operatively located between the transfer gate 172 and the printer 162. The first 160 or second 164 paper extends between the third feed wheels 192, 194. The third feed wheels 192, 194 are operative to engage either the first or second paper web and move it to the printer 162. As depicted in FIG. 7, a motor 196 is operatively connected to the third feed wheels 192, 194. The motor 196 is operative to rotate the third feed wheels 192, 194 to move paper to the printer 162. A third paper presence sensor 198 is positioned between the third feed wheels 192, 194 and the transfer gate 172. The third paper presence sensor 198 senses the presence of paper passing out of the transfer gate 172.

In some exemplary embodiments the feed wheels can include outer resilient material that is operative to engage the paper web in generally nonslip engagement. For example, the feed wheels can include resilient rubber rolls or other suitable paper moving devices. Further, it should be understood that for purposes of this disclosure that although rollers are described as being used to engage and move the paper, in alternative embodiments other suitable paper moving devices such as belts, flapper wheels, or other suitable moving devices may be used.

In some exemplary embodiments the sheet sensors can comprise optical sensors suitable for sensing the paper adjacent thereto. However, it should be understood that other types of suitable sensor such as mechanical sensors, ultrasonic sensors, infrared sensors, or other suitable sensors may be used in other embodiments.

As seen in FIG. 7, a cutter, schematically indicated at 200, is located downstream of the third feed wheels 192, 194. The cutter 200 is positioned adjacent to the paper path in printer 162. The cutter 200 may be of the type previously described and may be selectively operative to transversely cut the paper web into separate individual sheets. A presenter drive 202 engages the paper and, after the paper cutting, selectively moves the cut sheets toward the delivery area 50, which is adjacent to the opening 24. The presenter drive 202 may be a similar configuration as the presenter drive 122 of the previously discussed printing arrangement 30. The presenter drive 202 is operative to cause the paper (e.g., transaction receipt) to be extended through (out of) the opening 24 so that it can be easily accessed by a user. As previously discussed, the opening 24 may be associated with a movable access gate.

The exemplary printing arrangement 148 includes a controller 204. The controller 204 may include a microprocessor. The microprocessor is in operative connection with a memory. The memory may be a semi-conductor memory or firmware. However, in other embodiments other types of memories of the type previously described may be used. The controller 204 which causes operation of the receipt transport and retrieval system may also operate the printer 162 and control the printing of the receipt forms. In other exemplary embodiments, separate controllers for each of the printer, the receipt transport, and the retrieval system may be used.

As depicted in FIG. 8, the first and second paper presence sensors 182, 190 are operatively connected to the controller 204. The motor 178 is operatively connected to the controller 204. As depicted in FIG. 7, the third paper presence sensors 198 are operatively connected to the controller 204. The motor 196 is operatively connected to the controller 204. The controller 204 operates responsive to signals from the sensors 182, 190, 198 to control the motors 178, 196 in accordance with its associated programming. The controller 204 is also operative to cause a drive device to change the position of the transfer gate 172.

An operation of the exemplary printing arrangement 148 for printing receipts inside the housing of ATM 10 will now be discussed. FIGS. 7 and 8 show the printing arrangement 148 before the printing of a receipt, with the paper rolls 150, 152 generally full of paper. In this state, the first paper web 160 extends to the third feed wheels 192, 194. The first paper web 160 is engaged between the first feed wheels 174, 176 and between the third feed wheels 192, 194. In this state, the second paper web 164 extends to the transfer gate 172 and is engaged between the second feed wheels 184, 186. The transfer gate 172 is in the first position to allow (and guide) the first paper web 160 to pass through to the feed wheels 192 and 194.

When a printing operation is executed, the first paper presence sensor 182 senses the presence of the first paper web 160 and outputs one or more signals to the controller 204. The controller 204 processes the signals and outputs one or more control signals to the stepper motor 178 to drive the one way clutch 180, which in turn drives the first feed wheels 174, 176. The first feed wheels 174, 176 rotate to move the first paper web 160 along the path toward the feed wheels 192, 194. Simultaneously, the third feed wheels 192, 194 are rotated by the motor 196 to move the first paper web 160 toward the printer 162. After printing of the receipt, the cutter 200 is operated to transversely cut the first paper web 160 into a receipt. The presenter drive 202 then causes the prepared receipt to be engagingly selectively moved toward the delivery area 50.

Subsequent printing operations will operate in this manner until the first paper web is no longer present in the upper passage (between feed wheels 174, 176). This situation indicates that the first paper roll is at or near empty, or is otherwise not supplying sufficient paper for printing. When the first paper presence sensor 182 does not sense the presence of the first paper web 160, it then outputs one or more signals to the controller 204. The controller 204 processes the signals and then outputs one or more control signals to the stepper motor 178 to drive the one way clutch 188, which in turn drives the second feed wheels 184, 186. These second feed wheels 184, 186 rotate to move the second paper web 164 along the path toward the feed wheels 192, 194. The transfer gate 172 pivots counter clockwise (as viewed in FIG. 8) to the second position (FIG. 9) to guide the second paper web 164 to pass toward the third feed wheels. The third feed wheels 192, 194 engage the second paper web 164 and are rotated by the motor 196 to move the second paper web 164 toward the printer 162 as depicted in FIG. 9. After printing of the receipt, the cutter 200 is operated to cut the second paper web 164 into a receipt. The presenter drive 202 then selectively moves the receipt toward the delivery area.

When the second paper presence sensor 190 no longer senses the presence of the second paper web 164, the second paper presence sensor 190 outputs a signal to the controller 204. The controller 204 processes this signal and outputs a control signal to the stepper motor 178 to stop operating the second feed wheels 184, 186.

The controller 204 may also be operatively connected to first paper low sensor 154 to operate the first and second feed wheels in conjunction with the first and second paper presence sensors 182, 190. For example, when the first paper low sensor 154 outputs a signal to the controller 204 representing that the paper in the first paper roll 150 is not empty and the first paper presence sensor 182 outputs a signal to the controller 204 indicating the presence of the first paper web 160, the controller 204 processes these signals and outputs one or more control signals to the motor 178 to operate the first feed wheels 174, 176. Then, when the first paper low sensor 154 outputs a signal to the controller 142 representing that the paper in the first paper roll 150 is empty, and the first paper presence sensor 182 outputs a signal to the controller 204 indicating the absence of the first paper web 160, the controller 204 processes these signals and outputs one or more control signals to the stepper motor 178 to operate the second feed wheels 184, 186. The controller 204 also outputs one or more control signals to operate a drive to change the position of the transfer gate 172.

As previously mentioned, when the first and second paper low sensors 154, 158 sense that their respective first and second paper rolls 150, 152 are empty (or have reached a predetermined low paper level), they output a signal to computer 21 which processes the signal and then sends a message to the remote system 156, which indicates to a servicer (or to an ATM user) that the one or both paper rolls are empty and will need to be changed. Alternatively, the first and second paper presence sensors 182, 190 may be used instead of the first and second paper low sensors 154, 158 to output a signal to the computer that their respective paper rolls are empty. Also, the banking computer 21 may be used instead of the controller 204 to operate the roll transfer mechanism.

Again, the ATM computer may operate in the manner of the previously discussed embodiment to send a message to a remote system that causes a servicer to be notified that paper will need to be replenished on the next service call. A servicer may then access the mechanism and replace the depleted paper roll with a new paper roll. This may be done, for example, by placing the new paper roll in operatively supported connection with the housing of the machine and extending the paper web from the new roll to the appropriate feed wheels. For example if paper roll 150 is being replaced and a printer is being supplied with paper from roll 152, the servicer acts to extend the paper web from roll 150 over idler 168 and into engagement between feed rolls 174 and 176. This can be done in some embodiments by manually turning knobs, belts, or other devices using suitable engaging handles such as the knobs previously discussed.

Alternatively, the machine may include one or more manual input devices in operative connection with the controller that enables the servicer to electronically operate feed rolls or other devices in response to manual inputs so that the paper web may be fed into engagement with the rolls and moved therewith until sensed by the associated sensor 182. Once in this position, movement of the paper web from the new roll is stopped. The paper web from the new roll is then ready to be fed past the gate 172 and to the printer when the other roll currently supplying the printer is depleted.

Of course it should be understood that when the roll 152 is depleted it may be replenished in a similar manner including removing the depleted roll and extending the paper web from the new roll into engagement with the idler 170 and between feed rolls 184 and 186 until the paper from the new roll is sensed by sensor 190. Alternatively or in addition when the paper from both rolls has been depleted the service person may cause paper from one new roll to be fed all the way through to engage third feed rolls 192 and 194 while paper from the other new roll is extended only to its associated sensor located adjacent to the transfer gate. As can be appreciated, various additional sensors, feeding devices, manual input devices, and other components may be provided in alternative embodiments for purposes of feeding and replenishing paper rolls. Other embodiments allow for automated replacement of paper rolls.

FIGS. 10-12 show additional shapes and orientations for a transfer gate. FIG. 10 shows a three-sided triangular-shaped transfer gate 300 that has been pivoted clockwise (downward) about its center axis 302. That is, the gate 300 has been rotated in the direction of arrow A. The pivot orientation allows paper 160 to be guided by engagement with an upper side of the gate into a channel 304 through which the paper can then flow to the feed wheels 192, 194. The channel 304 can be formed of an upper plate section 306 and a lower plate section 308. The channel 304 can be at least as wide as the width of the paper 160.

FIG. 11 shows an arrowhead-shaped transfer gate 310 that has been pivoted counter clockwise (upward) about its center axis 312. That is, the gate 310 has been rotated in the direction of arrow B. The orientation allows paper 164 to be guided by engaging a lower side of the arrowhead into a channel 314. The channel has an upper plate section 316 comprising a portion 317 that slopes downward toward the lower plate section 318. This ensures that the paper 164 will be aligned with the entry to the feed wheels 192, 194.

FIG. 12 shows an example of a fixed (non movable, set, rigid) transfer gate 320. The gate 320 includes a first (top) inwardly curved side 322 and a second (bottom) inwardly curved side 324. The first concave side 322 guides first roll paper 160 toward a guide plate 326, which leads to the feed wheels 192, 194. The second concave side 324 can similarly guide second roll paper 164. Use of an upper guide plate 328 is optional. Again, a guide plate can have a width that substantially corresponds to the width of the paper 160, 164.

Of course, in other embodiments a gate similarly configured like gate 320 can be used in arrangements that require gate movement (e.g., pivoted, rotated, slid, etc.). Again, gate movement can be caused by a drive mechanism controlled by a processor associated with paper sensors. Alternatively, movement of a (non driven) freely pivoting (or swinging) gate can be caused by (the frictional engagement of) the paper itself as it abuts the gate.

Figure 13:
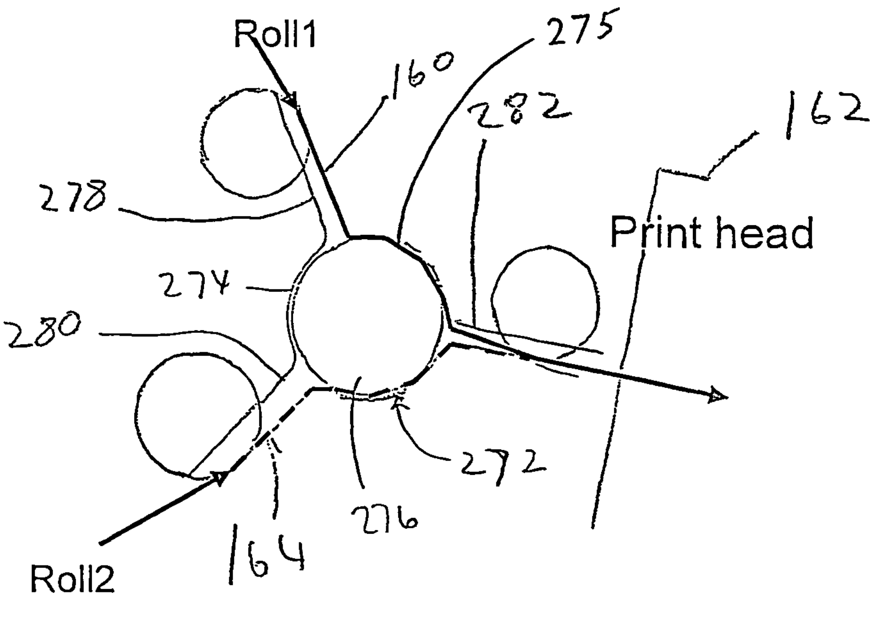
FIG. 13 is a view showing an alternative exemplary transfer gate of the roll transfer mechanism of the printing arrangement of FIG. 7.

FIG. 13 shows an alternative transfer gate 272. This gate 272 includes a star-shaped or three-pronged housing 274. The housing 274 also includes first, second, and third projections 278, 280, 282. The projections can be hollow. The first projection 278 radially extends outward from the hub of the housing 274 toward the first feed wheels 174, 176. The second projection 280 radially extends outward from the hub of the housing 274 toward the second feed wheels 184, 186. The third projection 282 radially extends outward from the housing hub toward the third feed wheels 192, 194. Between the projections 278 and 282 the hub of the housing 274 includes an outer circumferential surface portion which comprises a hub roller portion 275. Another hub roller portion 275 is located between the projections 280 and 282. The exemplary gate includes at least two spaced hub roller portions 275. However, in order to be able to use a gate having equally configured sides, a respective hub roller portion 275 can be located between each of the three projections to maintain uniformity. The uniformity also eases gate installation.

In different embodiments the gate housing 274 can be fixed or alternatively movable. In an exemplary embodiment, a rotatable roller 276 is mounted inside the hub of the housing 274. The roller 276 can be freely movable or alternatively moved by a drive device. The roller 276 allows the gate 272 to be movably mounted in the ATM.

The first paper web 160 is received between the first 278 and third 282 projections and is also engaged by a hub roller portion 275 to direct the first paper web 160 toward the printer 162. When the first paper roll 150 is determined to be in an empty state or condition, the second paper web 164 is then received between the second 280 and third 282 projections. The second paper 164 is engagingly guided by another hub roller portion 275 to direct this paper 164 toward the printer 162. As previously discussed, one or more guide plates (like guide plate 326) can be used to direct and/or align paper that is being moved toward feed wheels and/or a printer.

In another alternative printing arrangement, the first and second paper rolls may supply paper at respective locations in a common path. For example, the first paper roll may supply a first paper web at a first location in the paper path and the second paper roll may supply a second paper web at a second location in the paper path that is upstream from the first location.

The types of printers which may be used in various embodiments may be capable of printing documents of various types using various printing techniques. Such techniques may include impact printing, ink jet printing, laser printing, thermal printing, or other techniques suitable for producing printed indicia. The printer while supplied with paper from paper rolls in the exemplary embodiment may alternatively be provided with paper from other types of paper supplies such as a fan fold stack of paper or other source of continuous or noncontinuous paper. In the exemplary embodiment, the printer is a thermal type printer and the paper is supplied to the printer as a generally continuous web from rolls of thermal sensitive paper.

The thermal printer and other devices of the exemplary statement printer are operated responsive to signals from one or more computers (which are alternatively referred to as controllers) operating in the ATM. The computer provides the appropriate signals which achieve printing of the desired indicia on the paper. The computer also provides the signals to achieve the desired movement, cutting and delivery of the paper in coordinated relation with the printing activities and other transaction functions carried out by the ATM. The receipts typically show the type of transaction and the value or amount involved. Other information may also be included on receipts depending on the type of machine and the transaction. Receipts may include information such as the user's name, the time of day, a location where the transaction was conducted, an account involved, as well as one or more account balances. Certain types of automated transaction machines also enable a user to obtain a printed record of transactions that have been conducted. This record may comprise an account statement which indicates activity concerning a particular account. For example, a consumer operating an ATM may obtain an account statement which shows additions and withdrawals to their savings or checking account.

It should be understood that although the exemplary embodiments have been described in connection with receipt printers, the principles described may be used in connection with other types of printers. These may include, for example, statement printers, journal printers, or other types of printing devices used in automated banking machines. Also, the principles described herein may be used in connection with printing other types of material. For example, in some exemplary embodiments, automated banking machines may print receipts, labels, wagering slips, wagering tickets, scrip, admission tickets, transportation tickets, coupons, travelers checks, bank checks, blank checks, personal checks, money orders, personal memos, user images, boarding passes, stamps, and/or other types of printed media. Thus, various embodiments of automated banking machines that include multi-rolls of print media can be used to print various items.

For example, in an exemplary embodiment an automated banking machine has a dual supply of rolls of paper, one paper roll is designated (or dedicated) for printing transaction receipts and the other paper roll is designated for printing checks (e.g., personal checks, bank checks, travelers checks, money orders, and/or blank checks). The blank checks can be drawn on a bank customer's account, a bank's account, or some other account (an institution's account). A printed check can include visible indicia, magnetic indicia, digital signature, and/or RFID (radio frequency identification/identifier) data (e.g., an RFID tag including account information, check amount, etc.). A person using the machine (e.g., a customer of the machine) can pay for the amount (cash value) of a printed check (plus any other fee due) using cash, credit account, debit account, checking account funds, savings account funds, money card, gift card, etc. The same type (or kind) of check paper can be used to print different types of checks. Also, the same type of check paper can be used to print different (non check) items (e.g., tickets, coupons, memos, etc.) other than checks. Likewise, receipt paper can be used to print non receipt items. Print material designated for printing a primary item can be used for another.

Further, as previously discussed, more than two (dual) rolls of print material (e.g. paper) can be used to enable the machine to print various items that respectively require various types of different (distinct) base print material (material which is printed on). For example, a first print material can be used to print receipts, a second print material can be used to print checks, and a third print material can be used to print high resolution images. Each of the first, second, and third (rolls of) print materials can be directed to the same single printer. Alternatively, more than one printer may be used to bypass printer malfunctions. For example, the first and second print materials can share a first printer, the second and third print materials can share a second printer, and the third and first print materials can share a third printer. Thus, loss of any single one of the three printers does not affect any of the printing capabilities of the machine.

Another example of an exemplary embodiment of an automated banking machine having plural supply rolls for printing will now be described. The automated banking machine has a multi-supply roll of different print material, where at least one of the rolls contains stamp printing material. The material can allow postage stamp data to be printed thereon by a printer, such as a thermal printer. The material can comprise thermal sensitive paper that has pre-perforated sections of peel off paper having a self adhesive backing. Thus, the ATM can print and dispense a legally valid sheet of stamps that can be used to send items (letters) through a mail service, such as the USPS. Each stamp can have one or more bar codes thereon. A bar code can be one-dimensional (e.g., lines), two-dimensional, or three-dimensional. The material can also be used to print labels, including identification labels and return address labels.

An ATM host computer can instruct a specific ATM to print specific machine-readable bar codes. The host can send payment data corresponding to these specific bar codes to a mail service computer. Each of the bar codes can be individually recognized as containing data that corresponds to a paid for stamp by a mail service computer. That is, stamp payment verification can be made before delivery of mail. Customer payment for stamps can be made by cash provided to the ATM, use of a debit or credit (card) account, use of a checking or savings account, or other known methods of payment to ATMs.

In a further exemplary embodiment, an ATM can dispense personalized postage stamps, including stamps that have thereon an image (e.g., an image captured with a camera, a picture, a drawing, design, logo, expression, etc.). The images can be user-selected from several image choices provided by the machine. Unique images, such as those captured with a camera, can also be directly inputted to the ATM by the stamp purchasing customer.

The ATM includes one or more ports that are operative to receive an image from a machine user. Various types of data transfer ports can be used by the machine, including USB and wireless connections. The ATM is also able to copy (image) photos provided by customers. For example, the same imager device used by the machine to image received financial checks can also be used to image (copy) tangible paper photos input to the machine by customers.

A computer associated with the machine, such as the ATM control computer, is programmed to follow a template for creating postage stamps that contain both one or more bar codes and a personalized image. Human-readable data can also be printed as part of the stamp, including the postage amount, whether the amount is fixed or is variable (e.g., a "forever" type of stamp), country of usage, captions, identifiers, etc. The machine-readable bar code can contain data that corresponds to at least some of the human-readable data. The bar code can also contain additional data, such as the name of (or code corresponding to) the entity that created the stamp, the date of stamp issue/creation, location of issue, purchaser data, transaction data, etc.

The machine is able to print and dispense various amounts of stamps, including stamps of different sizes. The number of stamps that can be printed in a single row can vary depending on several factors, including stamp dimensions, stamp orientation, and size (width) of paper receivable by the printer. In an exemplary embodiment, the width of a row of stamps substantially corresponds to the width of a printed receipt. For example, the same width may allow for either five small stamps or only one extra large stamp. Thus, twenty small stamps could be printed in four continuous rows. Perforations could be made by the printer before or after printing a row or rows. Alternatively, the paper could be pre-perforated for printing only single sized stamps. That is, the paper on the paper roll could already be perforated.

A customer can have an option to request/receive a specific number of stamps (e.g., 12 stamps, 100 stamps, etc.). A certain amount of rows of stamps can be printed, cut (sheared) from the remainder of the roll paper, and dispensed to the customer. That is, the machine is able to print the specific number of rows (or stamps) selected by a customer. Because stamp paper is provided on a continuous paper roll, the machine does not have to require that a minimum amount of stamps be purchased. A purchase can comprise a single row (or stamp) or several rows. The number of stamps printed in a prior purchase does not affect the number of rows of stamps that can be printed in the next purchase. The printed stamps can also be dispensed as a single continuous perforated sheet of paper.

The exemplary arrangement allows for a single (shared) ATM printer to print both receipts and stamps. As previously discussed, different drives can be used to switch between the types of paper being supplied to the printer. For example, in order to print stamps following the printing of a receipt, the receipt paper roll can be reversed to cause receipt paper to be retracted away from entry to the printer, whereas the stamp paper roll can be advanced to cause stamp paper to move toward entry to the printer. Alternatively, instead of retracting paper, the (small amount of) paper that would have been retracted can instead be cut and dropped by gravity into a waste storage area in the machine. The amount of paper that is cut can be a predetermined same amount. The cutting allows the printer to receive different paper (from another paper roll).

In an exemplary embodiment, an ATM has dual paper paths that lead to a single printer. The ATM has dual paper rolls comprising a receipt paper roll and a stamp paper roll. However, it should be understood that both paper rolls can be used for printing stamps. That is, both (or more) paper rolls can comprise stamp paper. This arrangement allows the machine to dispense stamps of different sizes. One roll can be pre-configured for providing stamps of a first size, with the other roll pre-configured for providing stamps of a second (different) size. Also, the different stamps (and/or receipt) can be presented to a customer through the same outlet opening.

Figure 14:
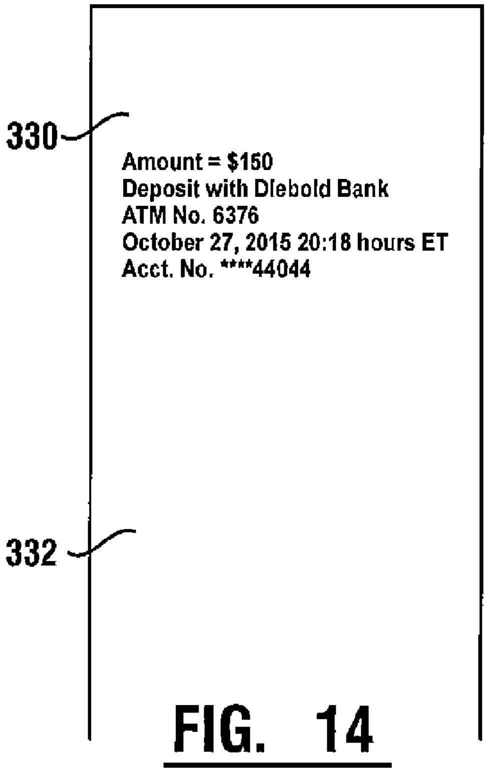
FIG. 14 shows a printed transaction receipt.
Figure 15:
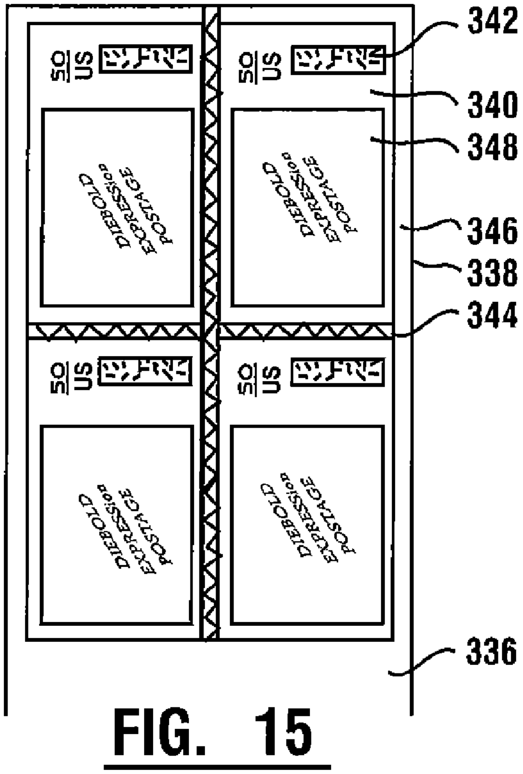
FIG. 15 shows an example of stamps printed by an automated banking machine.
Figure 16:
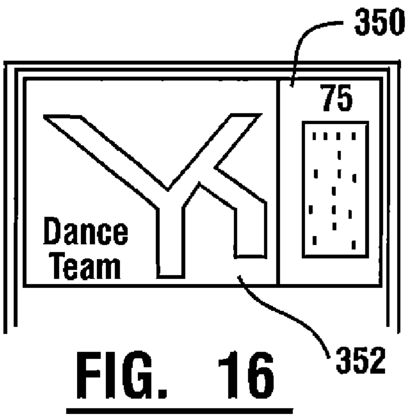
FIG. 16 shows a different stamp printed at an automated banking machine.
Figure 17:
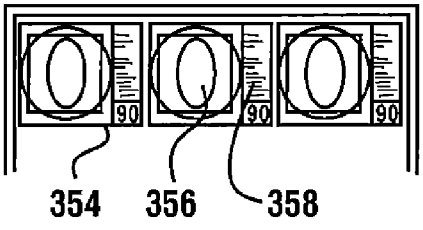
FIG. 17 shows other stamps printed by an automated banking machine.

FIG. 14 shows an example of a transaction receipt 330 that was printed with a shared color printer of an automated banking machine. The receipt can be printed using only black ink. The receipt paper 332 was taken from a first paper supply roll. FIGS. 15-17 show examples of stamps that were also printed by the shared color printer of the automated banking machine. The stamps can be printed using multi colors. The stamp paper 336 was taken from a second (different) paper supply roll which has paper with characteristics that differ from those of the receipt paper 332.

FIG. 15 shows two rows of two stamps 340 per row 338. A bar code 342 includes the necessary data that allows each stamp 340 to pass verification as being legally valid for mail delivery usage. The stamps have indicia indicating an initial stamp value of 50 cents (US currency). The stamps are separated by perforations 344. The stamps can be individually removed from the backing paper 346 and then stuck onto an envelope. The stamp printing template program allows each stamp to have a reserved area 348 for a personalized image, as previously discussed. In the FIG. 15 example, the image comprises the message "Diebold Expression Postage."

FIG. 16 shows a $0.75 US dollar stamp 350 having an image 352 that comprises a logo for a dance team. The logo was originally on a paper (e.g., a check, photograph, business card, etc.) that was received into the machine from a customer. This enabled the machine to then scan the paper and create a digital image using the machine's check imager. The created image was then displayed to the customer. The customer was then able to use the machine to select (sparse out) from the displayed image the desired (logo) portion of the image that is to be on the stamp. The customer can also choose how the image will be oriented on the stamp. The machine then adds the selected portion (logo) to the reserved area of the stamp. Next the machine allows the customer to select any language (e.g., characters) that will be on the stamp. The characters can be provided using an input device (e.g., keyboard) of the machine. The programming also allows the customer to position (overlay) the language onto the image. As can be seen, the language "Dance Team" was inserted onto the stamp. Before printing, the machine displays how the stamp will look to the customer. The customer can then change the look of the stamp. Different portions of the displayed stamp can also be selected to have different colors changed.

FIG. 17 shows $0.90 US dollar stamps 354, each having an image 356 that was digitally created using a customer's computer (e.g., PC, tablet, etc.). The created image was wirelessly transferred to the machine using a smart phone (or tablet, etc.). The bar code 358 has spaced lines of various length (e.g., a one dimensional bar code).

As can be seen, the width of the stamp paper used in FIGS. 15-17 is substantially the same width of the receipt paper used in FIG. 14. The stamp paper width allows three stamps per row in FIG. 17, two stamps per row in FIG. 15, and one stamp per row in FIG. 16. As previously discussed, the number of stamps that can be printed in a single row depends on factors such as stamp dimension and orientation.

The system of the exemplary embodiments may also be operated by a computer in a number of other different ways in response to the occurrence of certain programmed conditions. For example, in some exemplary embodiments the automated banking machine may operate to retract receipts or other items that were output by the machine but not taken by the user. This may occur, for example, when a user is presented with a receipt for a transaction that has been conducted but the user leaves the machine area without taking the receipt. The exemplary automated banking machines includes a mechanism that enables receipts to be retracted and then stored within the machine. Such a receipt retraction mechanism is operated in response to one or more computers after waiting a certain time period after a receipt has been presented. If the receipt is not taken by a user within the predetermined time period, then the receipt is retracted into the machine by reversing belts or other drive mechanism that were used to initially present the receipt to a user. The retracted receipt is directed by a gate or other suitable mechanism into a storage location for storage within the machine. During normal operation the computer operates in accordance with its programming to retract receipts into a receipt storage location. The computer can also operate in accordance with its programming to purge a receipt outward from the receipt opening in response to a storage location being full, or in response to the receipt being too long to retract.

The computer of some exemplary embodiments may also be programmed to operate in ways which are operative to correct malfunctions, such as paper jams. The system is also operative to sense characteristics of the paper so that the computer may dynamically store and change stored threshold values to match the character of the paper in the sheets being used. The system may be dynamically adaptable to paper of varying quality and color. The computer in some embodiments may also be operable to store and update threshold values that are indicative of paper being sensed adjacent to a sensor as printing activities are conducted. In this way, the system is enabled to operate properly with paper types that vary substantially. It may also accommodate variations in the paper which occur in the middle of a roll or fanfold stack.

The system may also dynamically adjust to the optical properties of "top of form" (TOF) marks when TOF type paper is used. TOF marks are generally dark marks which are positioned on each sheet form. They are used to provide a reference for the printing and cutting of the form. Because TOF marks are uniformly positioned and are normally much darker (less reflective) than the surrounding surface of the form, the controller may be programmed to respond to the significant reflectance fluctuations associated with TOF marks and make an adjustment decision based on the presence or absence of such fluctuations.

If TOF paper is indicated to be present, the computer operates in accordance with its programming to cause the printer to advance the paper using rolls and/or other drive mechanisms a sufficient distance to collect sample information concerning the reflectance of the paper in the area of the TOF marks as well as in areas disposed from the marks. In an exemplary embodiment the paper is advanced by the printer a distance of at least two TOF marks and threshold values corresponding to the presence of paper and the presence of a TOF mark on the paper adjacent to sensor are updated and stored in memory.

Further features which may be used in some exemplary embodiments are disclosed in U.S. Pat. No. 5,850,075, the disclosure of which is herein entirety incorporated by reference.

A favorable features of some of the exemplary printing arrangements is that when a first paper supply roll is empty, the second paper supply roll continues to supply paper to the printer so that the printing of receipts can continue. Thus, service personnel do not need to immediately replace the deleted first paper supply roll with a new paper supply roll. In addition, little or no paper is wasted when replacing the first paper supply with a new paper supply, since the service personnel replace the first supply roll only when it is empty (or has obtained a predetermined low amount level). This is in contrast to a situation that can occur when an automated banking machine includes only a single roll of paper that is used for printing receipts (or other types of printed media). As can be appreciated, in order to avoid such a machine from running out of paper, it is often advisable for a service person to replace a paper supply roll that is running low, but that may have substantial amounts of paper remaining. As can be further appreciated, as the time and expense associated with conducting a service call on a machine is much greater than the cost of the paper, ATM service companies may find it beneficial to simply replace a roll that has considerable paper left with a new roll that will run for a much longer period of time, thus avoiding the need for a service call at the time when the existing paper is close to depletion. This results in considerable waste of paper and resources. The exemplary embodiments allow for cost savings in service time, cost savings in paper supply, and reduction of waste.

Of course it should be understood that these approaches are exemplary and in other embodiments other approaches may be used.

Thus the exemplary embodiments achieve at least some of the above stated objectives, eliminate difficulties encountered in the use of prior devices and systems, and attain the useful results described herein.

In the foregoing description certain terms have been described as exemplary embodiments for purposes of brevity, clarity and understanding. However no unnecessary limitations are to be implied therefrom because such terms are used for descriptive purposes and are intended to be broadly construed. Moreover the descriptions and illustrations herein are by way of examples and the invention is not limited to the features shown or described.

Further, in the following claims any feature described as a means for performing a function shall be construed as encompassing any means known to those skilled in the art as being capable of carrying out the recited function, and shall not be deemed limited to the particular means shown or described for performing the recited function in the foregoing description, or mere equivalents thereof.

Having described the features, discoveries and principles of the invention, the manner in which it is constructed and operated, any of the advantages and useful results attained; the new and useful structures, devices, elements, arrangements, parts, combinations, systems, equipment, operations, methods, processes, and relationships are set forth in the appended claims.

We claim:

1. Apparatus comprising:

automated banking machine,
- wherein the machine includes at least one reader,
  - wherein the at least one reader is operative to read user data usable to identify a financial account,
    - wherein the machine is operable to cause a financial transfer involving the financial account responsive at least in part to computer-determined correspondence between user data read by the at least one reader and the financial account,
- wherein the machine includes a cash dispenser,
  - wherein the cash dispenser is operative to dispense cash to authorized users of the machine,
- wherein the machine includes a user interface,
  - wherein the user interface includes at least one user display,
    - wherein each user display includes a display screen,
- at least one paper supply,
  - wherein the at least one paper supply includes a first paper supply,
    - wherein the first paper supply includes a first roll of paper,
  - wherein the at least one paper supply includes a second paper supply,
    - wherein the second paper supply includes a second roll of paper,
      - wherein the second roll is spaced from the first roll,
- a paper transfer arrangement,
  - wherein the paper transfer arrangement includes a first outer platen, a center platen, and a second outer platen,
    - wherein a passage between the center platen and the second outer platen forms a first paper path, wherein the first paper path is positioned to receive paper from the first roll,
    - wherein a passage between the first outer platen and the center platen forms a second paper path, wherein the second paper path is positioned to receive paper from the second roll,
    - wherein the center platen includes an opening having a size that allows paper to pass through the opening,
    - wherein one of the first outer platen and second outer platen includes an outer platen section that extends toward the center platen,
      - wherein the outer platen section is configured to cause paper from one of the first paper path and second paper path, to pass through the opening into the other one of the first paper path and second paper path,
      - wherein the other one of the first paper path and second paper path beyond the opening comprises a shared paper path,
  - wherein the paper transfer arrangement includes at least one first feed wheel and at least one second feed wheel,
    - wherein the at least one first feed wheel includes plural first feed wheels,
      - wherein the plural first feed wheels extend through a respective opening in the first outer platen,
      - wherein each first feed wheel includes an outer surface that comprises resilient material,
      - wherein each respective first feed wheel is rotatable about a first axis to cause paper in the first paper path to be engagingly moved between the center platen and the resilient material of the respective first feed wheel, wherein the at least one second feed wheel includes plural second feed wheels, wherein the plural second feed wheels extend through a respective opening in the second outer platen, wherein each second feed wheel includes an outer surface that comprises resilient material, wherein each respective second feed wheel is rotatable about a second axis to cause paper in the second paper path to be engagingly moved between the center platen and the resilient material of the respective second feed wheel, wherein the paper transfer arrangement includes at least one first roller and at least one second roller, wherein the at least one first roller extends into the shared paper path through a respective opening in the center platen, wherein the at least one first roller is rotatable about a first roller axis, wherein the at least one second roller extends into the shared paper path through a respective opening in the other one of the first outer platen and second outer platen, wherein the at least one second roller is rotatable about a second roller axis, wherein the at least one second roller is substantially aligned opposite the at least one first roller relative to the shared paper path, wherein the at least one first roller and the at least one second roller are respectively rotatable to allow paper in the shared paper path to pass there between, at least one drive, wherein the at least one drive includes at least one motor, wherein the at least one motor is operative to cause rotation of the plural first feed wheels and the plural second feed wheels, a printer, wherein the printer is at a location which causes the paper transfer arrangement to be positioned intermediate the at least one paper supply and the printer, wherein the printer is positioned to receive paper from the shared paper path, wherein the printer is selectively operative to print transaction receipt indicia on paper received from the shared paper path, at least one first paper supply sensor operative to detect paper of the first paper supply, at least one second paper supply sensor operative to detect paper of the second paper supply, at least one controller, wherein the at least one controller is operatively connected to the at least one drive, the printer, the at least one first paper supply sensor, and the at least one second paper supply sensor, wherein the at least one controller is operative to receive respective signals from the at least one first paper supply sensor and the at least one second paper supply sensor, wherein the at least one controller is operative responsive at least in part to signals received from the at least one first paper supply sensor, to determine whether the first paper supply has reached a predetermined low level, wherein the at least one controller is operative responsive at least in part to a negative determination, to cause the at least one drive to move paper from the first paper supply toward the printer, wherein the at least one controller is operative responsive at least in part to a positive determination, to both prevent the at least one drive from attempting to move paper from the first paper supply toward the printer, and cause the at least one drive to move paper from the second paper supply toward the printer.

2. The apparatus according to claim 1 wherein the automated banking machine is part of a banking system, wherein the machine includes the at least one computer, wherein the at least one computer includes the at least one controller, wherein the at least one reader includes at least one of a card reader and a biometric reader, wherein the at least one computer is operative to authorize the user to request a financial transaction involving the cash dispenser responsive at least in part on computer-determined correspondence between user data read by the at least one of a card reader and a biometric reader and user information stored in a data store, wherein the at least one computer is operative to cause data corresponding to at least a portion of read user data to be sent in at least one first message to at least one remote computer remotely located from the machine, wherein the at least one computer is operative to allow cash to be dispensed from the machine responsive at least in part to receipt by the at least one computer of at least one second message from the at least one remote computer.

3. Apparatus comprising:

automated banking machine, wherein the machine includes at least one reader, wherein the at least one reader is operative to read user data usable to identify a financial account, at least one paper supply, wherein the at least one paper supply includes a first roll of paper, wherein the first roll comprises a first class of paper designated by the machine for usage in printing receipts, wherein the at least one paper supply includes a second roll of paper, wherein the second roll comprises a second class of paper designated by the machine for usage in printing non receipt items, a printer, at least one drive, at least one paper sensor, at least one computer associated with the machine, wherein the at least one computer is operative during a machine operation that dispenses a receipt, to cause the at least one drive to supply the printer with paper from the first roll, and cause the printer to print receipt indicia on the paper supplied from the first roll, wherein the at least one computer is operative during a machine operation that dispenses at least one printed item of value, to cause the at least one drive to supply the printer with paper from the second roll, and cause the printer to print item of value indicia on the paper supplied from the second roll, wherein the at least one computer is operative to receive signals from the at least one paper sensor, wherein the at least one computer is operative responsive at least in part to signals received from the at least one paper sensor, to determine whether the first roll has reached a predetermined low level, wherein the at least one computer is operative responsive at least in part to a negative determination, to allow the at least one drive to supply the printer with paper from the first roll, wherein the at least one computer is operative responsive at least in part to a positive determination, to cause the at least one drive to only supply the printer with paper from the second roll.

4. The apparatus according to claim 3 wherein the first roll comprises receipt printing paper designated for use in printing transaction receipts, wherein the second roll comprises stamp printing paper designated for use in printing postage stamps.

5. The apparatus according to claim 4 wherein the stamp printing paper comprises peel off paper having a self adhesive backing.

6. The apparatus according to claim 4 wherein the at least one computer is operative to cause the printer to print postage stamp data indicia on the stamp printing paper, wherein the postage stamp data indicia includes a two-dimensional bar code.

7. Apparatus comprising:

automated banking machine, wherein the machine includes at least one reader, wherein the at least one reader is operative to read user data usable to identify a financial account, wherein the machine includes a user interface, wherein the user interface includes at least one user display, at least one paper supply, wherein the at least one paper supply includes a first paper supply, wherein the first paper supply includes a first roll of paper, wherein the first roll of paper comprises receipt printing paper designated for use in printing transaction receipts, wherein the at least one paper supply includes a second paper supply, wherein the second paper supply includes a second roll of paper, wherein the second roll of paper comprises stamp printing paper designated for use in printing postage stamps, a printer, wherein the printer is operative to print both indicia corresponding to transaction receipt data, and indicia corresponding to postage stamp data, at least one paper drive, at least one computer associated with the machine, wherein the at least one computer is operative during a machine operation that dispenses a transaction receipt, to cause the at least one paper drive to supply the printer with receipt printing paper from the first roll of paper, and cause the printer to print transaction receipt data indicia on the supplied receipt printing paper, wherein the at least one computer is operative during a machine operation that dispenses at least one postage stamp that is legally valid, to cause the at least one paper drive to supply the printer with stamp printing paper from the second roll of paper, and cause the printer to print postage stamp data indicia on the supplied stamp printing paper.

8. The apparatus according to claim 7 wherein the machine is part of a banking system, wherein the machine includes a cash dispenser, wherein the cash dispenser is operative to dispense cash to authorized users of the machine, wherein the at least one reader includes a card reader, wherein the at least one reader includes a biometric reader, wherein the machine includes at least one machine computer, wherein the at least one machine computer is operative to cause card data read by the card reader to be compared with card information stored in a data store, wherein the at least one machine computer is operative to cause customer biometric data read by the biometric reader to be compared with biometric information stored in a data store, wherein a customer is authorized to request a cash dispense transaction responsive at least in part to both computer-determined correspondence between read card data and stored card information, and computer-determined correspondence between read biometric data and stored biometric information.

9. The apparatus according to claim 7 wherein the user interface includes at least one opening, wherein the at least one opening includes a shared outlet opening, wherein the at least one computer is operative during a machine operation that dispenses a transaction receipt, to cause the at least one paper drive to move a printed transaction receipt into the shared outlet opening, whereat the printed transaction receipt is accessible by a user of the machine, wherein the at least one computer is operative during a machine operation that dispenses at least one postage stamp, to cause the at least one paper drive to move at least one printed postage stamp into the shared outlet opening, whereat the at least one printed postage stamp is accessible by a user of the machine.

10. The apparatus according to claim 7 wherein the stamp printing paper comprises peel off paper having a self adhesive backing, wherein the postage stamp data indicia includes a bar code.

11. The apparatus according to claim 7 wherein the at least one paper drive is operative to selectively rotate the first roll of paper and the second roll of paper, wherein the at least one paper drive is operative to rotate the first roll of paper in a dispensing direction and in a retracting direction, wherein the retracting direction is opposite the dispensing direction, wherein the at least one paper drive is operative to rotate the second roll of paper in a dispensing direction and in a retracting direction, wherein the retracting direction is opposite the dispensing direction, wherein the at least one computer is operative during a machine operation that dispenses at least one postage stamp, to cause the at least one paper drive to both
rotate the first roll of paper in the retracting direction, and
rotate the second roll of paper in the dispensing direction.

12. The apparatus according to claim 11 wherein the at least one computer is operative during the machine operation that dispenses at least one postage stamp, to cause the at least one paper drive to rotate the first roll of paper in the retracting direction prior to rotating the second roll of paper in the dispensing direction.

13. Apparatus comprising:
paper handling arrangement for a printer of an automated banking machine that includes at least one reader operative to read user data usable to identify a financial account,
wherein the paper handling arrangement includes:
a first paper roll including first paper,
a second paper roll including second paper,
a paper merger,
wherein the paper merger includes a first outer wall section, a center wall section, and a second outer wall section,
wherein a first path for the first paper extends between the first outer wall section and the center wall section,
wherein a second path for the second paper extends between the center wall section and the second outer wall section,
wherein the center wall section includes a paper merge slot,
wherein the paper merge slot allows first paper from the first path to pass therethrough into the second path,
a paper guide adjacent the paper merge slot,
wherein the paper guide directs paper from the first path into the paper merge slot,
a printer located downstream of the paper merge slot,
wherein the printer is positioned to receive paper from the second path,
wherein the printer is operative to print indicia, including transaction receipt indicia,
at least one first feed wheel,
wherein each first feed wheel extends into the first path through the first outer wall section,
wherein the at least one first feed wheel is rotationally operative to engagingly move first paper in the first path toward the printer,
at least one second feed wheel,
wherein each second feed wheel extends into the second path through the second outer wall section,
wherein the at least one second feed wheel is rotationally operative to engagingly move second paper in the second path toward the printer,
at least one drive,
wherein the at least one drive is operative to cause rotation of the at least one first feed wheel and the at least one second feed wheel,
wherein the at least one drive is selectively controllable to cause the printer to receive either first paper from the first paper roll or second paper from the second paper roll.

14. The apparatus according to claim 13 and further comprising an automated banking machine that includes at least one reader operative to read user data usable to identify a financial account, wherein the automated banking machine includes the paper handling arrangement.

15. The apparatus according to claim 14 wherein the automated banking machine is part of a banking system,
wherein the machine includes a cash dispenser,
wherein the machine includes at least one computer,
wherein the at least one reader includes at least one of a card reader and a biometric reader,
wherein the at least one computer is operative to authorize the user to request a financial transaction involving the cash dispenser responsive at least in part on computer-determined correspondence between
user data read by the at least one of a card reader and a biometric reader and
user information stored in a data store,
wherein the at least one computer is operative to cause data corresponding to at least a portion of read user data to be sent in at least one first message to at least one remote computer remotely located from the machine,
wherein the at least one computer is operative to allow cash to be dispensed from the machine responsive at least in part to receipt by the at least one computer of at least one second message from the at least one remote computer.

16. The apparatus according to claim 13
wherein the first paper comprises receipt printing paper designated for use in printing transaction receipts,
wherein the second paper comprises stamp printing paper designated for use in printing postage stamps,
wherein the stamp printing paper comprises peel off paper having a self adhesive backing,
wherein the at least one drive is selectively controllable to cause the printer to receive the receipt printing paper during a transaction receipt printing operation,
wherein the at least one drive is selectively controllable to cause the printer to receive the stamp printing paper during a stamp printing operation,
wherein the printer is selectively operable to both
print transaction receipt data on received receipt printing paper, and
print postage stamp data on received stamp printing paper,
wherein the postage stamp data includes a bar code.

17. The apparatus according to claim 13
wherein the first paper comprises receipt printing paper designated for use in printing transaction receipts,
wherein the second paper comprises receipt printing paper designated for use in printing transaction receipts,
wherein the at least one drive is selectively controllable to cause the printer to receive either the first paper or the second paper during a transaction receipt printing operation,
wherein the printer is selectively operable to print transaction receipt data on both the first paper and the second paper.

18. The apparatus according to claim 17
wherein the paper handling arrangement further includes
at least one first paper supply sensor operative to detect the first paper,
at least one second paper supply sensor operative to detect the second paper,
and further comprising at least one controller,
wherein the at least one controller is operatively connected to the at least one drive, the printer, the at least one first paper supply sensor, and the at least one second paper supply sensor, wherein the at least one controller is operative to receive respective signals from the at least one first paper supply sensor and the at least one second paper supply sensor, wherein the at least one controller is operative responsive at least in part to signals received from the at least one first paper supply sensor, to determine whether supply of the first paper has reached a predetermined low level, wherein the at least one controller is operative responsive at least in part to a negative determination, to cause the at least one drive to provide the printer only with first paper from the first paper roll, wherein the at least one controller is operative responsive at least in part to a positive determination, to cause the at least one drive to provide the printer only with second paper from the second paper roll.

19. The apparatus according to claim 18 wherein the at least one first paper supply sensor includes at least one paper low sensor located adjacent the first paper roll, wherein the at least one paper low sensor is operative to sense when the first paper roll has reached the predetermined low level, wherein the at least one controller is operative responsive at least in part to signals received from the at least one paper low sensor, to determine whether the first paper roll has reached the predetermined low level.

20. The apparatus according to claim 18 wherein the at least one first paper supply sensor includes at least one paper presence sensor located adjacent the first paper path, wherein the at least one paper presence sensor is operative to sense paper in the first paper path, wherein the at least one controller is operative responsive at least in part to signals received from the at least one paper presence sensor, to determine whether the first paper supply has reached the predetermined low level.

* * * * *